United States Patent
Willis et al.

(10) Patent No.: US 9,043,041 B2
(45) Date of Patent: May 26, 2015

(54) MONITORING AGGRESSIVE DRIVING OPERATION OF A MOBILE ASSET

(75) Inventors: Richard Ernest Willis, Surrey (CA); Richard Ian McIntyre, North Vancouver (CA); Gerald Alexander West, Surrey (CA); Peter Robert Henderson McConnell, Vancouver (CA)

(73) Assignee: Webtech Wireless Inc., Burnaby (CA)

( * ) Notice: Subject to any disclaimer, the term of this patent is extended or adjusted under 35 U.S.C. 154(b) by 491 days.

(21) Appl. No.: 13/086,086

(22) Filed: Apr. 13, 2011

(65) Prior Publication Data

US 2011/0202305 A1 Aug. 18, 2011

Related U.S. Application Data

(63) Continuation-in-part of application No. 12/656,657, filed on Feb. 12, 2010, now Pat. No. 8,589,015.

(51) Int. Cl.
| | |
|---|---|
| G05D 1/00 | (2006.01) |
| G01C 21/16 | (2006.01) |
| G07C 5/08 | (2006.01) |
| G07C 5/00 | (2006.01) |

(52) U.S. Cl.
CPC ............ *G01C 21/16* (2013.01); *B60T 2201/04* (2013.01); *B60T 2210/36* (2013.01); *B60T 2220/02* (2013.01); *G07C 5/008* (2013.01); *G07C 5/085* (2013.01)

(58) Field of Classification Search
USPC .......................................................... 701/29
See application file for complete search history.

(56) References Cited

U.S. PATENT DOCUMENTS

| | | | |
|---|---|---|---|
| 5,001,647 A * | 3/1991 | Rapiejko et al. | 701/509 |
| 7,119,669 B2 | 10/2006 | Lundsgaard | |
| 2005/0174217 A1 | 8/2005 | Basir | |
| 2008/0147280 A1 | 6/2008 | Breed | |
| 2008/0252487 A1 | 10/2008 | McClellan | |
| 2008/0255888 A1 | 10/2008 | Berbokin | |
| 2008/0262670 A1 | 10/2008 | McClellan | |
| 2008/0319589 A1 | 12/2008 | Lee | |
| 2008/0319602 A1 * | 12/2008 | McClellan et al. | 701/33 |
| 2009/0055033 A1 | 2/2009 | Gansler | |
| 2010/0318257 A1 | 12/2010 | Kalinadhabhotla | |

OTHER PUBLICATIONS

Tsang, Chi Chiu, Error Reduction Techniques for a MEMS Accelerometer-based Digital Input Device, The Chinese University of Hong Kong, copyrighted Mar. 2008, 85 pages.
Tsang, Chi Chiu, Error Reduction Techniques for a MEMS Accelerometer-based Digital Input Device, partial thesis submitted at the Chinese University of Hong Kong, copyrighted Mar. 2008, 28 pages.
U.S. Appl. No. 61/229,196, filed Jul. 28, 2009.
U.S. Appl. No. 61/187,019, filed Jun. 15, 2009.

* cited by examiner

*Primary Examiner* — Bhavesh V Amin
(74) *Attorney, Agent, or Firm* — John R. Flanagan

(57) ABSTRACT

The acceleration of a mobile asset is sensed and compared to threshold acceleration levels when the speed of the mobile asset is above a threshold speed. When the acceleration exceeds a threshold a report is created allowing aggressive driving behavior to be logged.

11 Claims, 12 Drawing Sheets

Auto Calibration Process

Self Calibration Process

Static Phase Calibration

Dynamic Phase (Auto) Calibration

FIG 7 - Dynamic Phase (Self) Calibration

Slope Calibration Process

Event Filtering – Accelerometer Service (Driver)
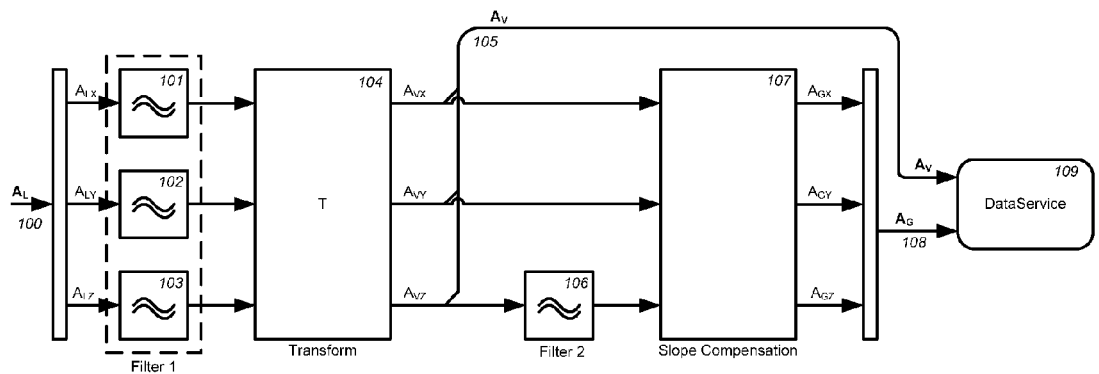
Event Filtering – Accelerometer Active Monitors
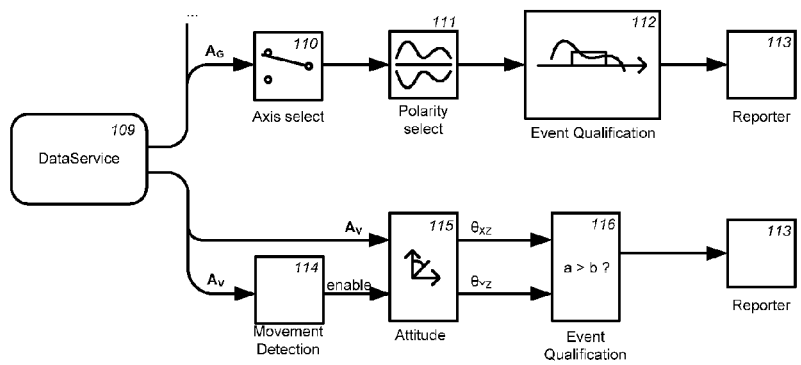
False event filtering flow diagram
FIG 9

MONITORING AGGRESSIVE DRIVING OPERATION OF A MOBILE ASSET

This application is a continuation-in-part of co-pending U.S. patent application Ser. No. 12/656,657 filed Feb. 12, 2010.

FIELD OF INVENTION

The present invention relates to the field of navigation systems, and more particularly to automated electronic monitoring of the movements and dynamics of a vehicle or other mobile asset. Specifically, the invention involves an improved system and method for monitoring the time, speed, location, and acceleration of mobile assets, the calibration of said system and method, the use of said system and method to determine the habits of operators of such mobile assets, and to detect abnormal events such as a collision or roll-over.

BACKGROUND OF THE INVENTION

Owners and operators of fleet vehicles and individual owners with inexperienced drivers have a number of concerns as to how the vehicles are driven in the course of their daily operations.

One of these concerns is the driving behavior, and in particular erratic or aggressive driving behavior. In addition, the ability to monitor and detect abnormal events such as collisions, vehicle rollover, excessive vibration and other dynamic vehicle events are of concern.

The measurement of vehicle parameters such as date, time, location, speed, and acceleration can be performed as part of a data logging function, much like a black box in an aircraft.

Various approaches for accelerometer alignment have been used in the past. One method is manually installing the sensor in a vehicle such that the axes of the sensor are physically aligned with the longitudinal, lateral, and vertical axes of the vehicle. Another method uses known accelerations along the longitudinal, lateral, and vertical axes of the vehicle to align the accelerometer. These methods required skilled installers and are time consuming.

Another undesirable aspect of the aforementioned methods is that the accelerometer can become misaligned over time due to vehicle impacts or mishandling. Such misalignments are not easily detected or corrected when the accelerometer has been deployed in the field and is operating.

It is desirable for an alignment method to require very little skill and time of the installer. In addition, it is desirable to use an alignment process that can adapt to sensor misalignment in the field.

SUMMARY OF INVENTION

The present invention was developed, in part, in response to a need for ease of accelerometer installation and the invention (event filtering) provides a reduction in false events and improves the quality of the product.

This invention relates to an in-vehicle system incorporating a computer, memory, vehicle I/O, a GPS module, a wireless modem, and an accelerometer for the purposes of providing information related to vehicle dynamics such as excessive speed, hard braking, aggressive acceleration, sharp cornering, and position.

An in-vehicle device incorporating an accelerometer for the purposes of providing information related vehicle activity such as hard braking, aggressive acceleration, sharp cornering, and position changes requires filtering of unwanted events (referred to herein as "signal artifacts") to increase the probability of detecting only valid events.

The invention covers the method of false event filtering that includes monitoring, detecting, and correcting for or ignoring false events. False event filtering is defined as the removal of unwanted signal artifacts that occur while a monitored vehicle is moving. Examples of signal artifacts include uneven road surfaces, bumps and dips or potholes; and gravitational biases caused by non-level road surfaces or inclines.

The invention may be implemented within an Accelerometer System consisting of an accelerometer service and an active acceleration monitoring application.

The purpose of the accelerometer system is to monitor vehicle acceleration (forward-backward, up-down and side-to-side) as well as vehicle attitude (nose-up, nose-down, bank, etc). The system can also detect vehicle movement while in a low power mode and act accordingly. The accelerometer system is responsible for processing the raw signals from the accelerometer hardware into signals representing the vehicle's frame of reference The active acceleration monitoring application contains a set of custom processes to interpret the processed data and capture events that occur. These events are qualified by a set of rules that the signal must comply with to qualify as a valid event.

An aspect of this invention is to detect aggressive driving behavior using the accelerometer data and the location system data. Aggressive driving is a major concern of the public, ranking at or near the top of traffic safety issues in national surveys of motorists.

Another aspect of this invention is a method of monitoring operation of a mobile asset comprising: determining acceleration of the mobile asset; determining speed of the mobile asset; and if the speed is above a threshold speed and the acceleration is above a threshold acceleration, reporting an event.

A further aspect of this invention is a method of monitoring operation of a mobile asset comprising: determining speed of the mobile asset; and if the speed is above a threshold speed: determining acceleration of the mobile asset; comparing the acceleration of the mobile asset to an acceleration threshold; and if the acceleration of the mobile asset is above the acceleration threshold, reporting an event.

A still further aspect of this invention is an apparatus for monitoring operation of a mobile asset comprising: three orthogonal accelerometers for providing outputs representing accelerations along three orthogonal axes, said accelerometers installed in the mobile asset; a low-pass filter connected to each accelerometer output for providing filtered outputs; a device for transforming the filtered outputs into accelerations along orthogonal forward, sideways and vertical axes of the mobile asset; a further low-pass filter for further filtering the acceleration along the vertical axis of the mobile asset; and a device into which is input the further filtered acceleration along the vertical axis and the filtered accelerations along the forwards and sideways axes and which outputs compensated accelerations along orthogonal forward, sideways and vertical axes of the mobile asset; wherein said compensated accelerations compensate for slope on which the mobile asset is moving.

BRIEF DESCRIPTION OF FIGURES

A better understanding of the present invention can be obtained when the following detailed description of the preferred embodiment is considered in conjunction with the following drawings, in which:

FIG. 9 shows the False Event Filtering process flow diagram;

DETAILED DESCRIPTION OF PREFERRED EMBODIMENT

Notice Regarding Copyrighted Material

Figure 1:
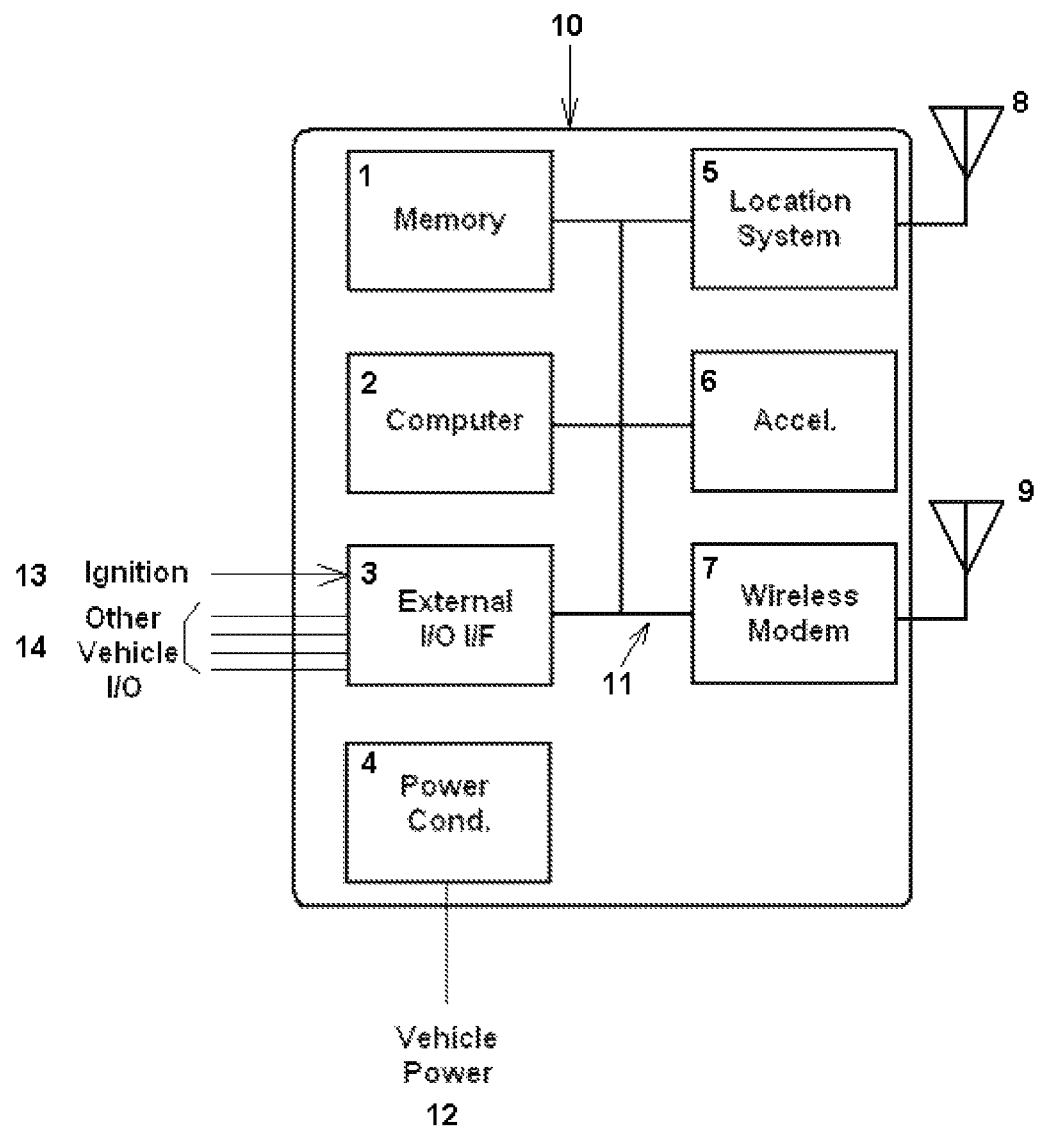
FIG. 1 is a block diagram of a typical Locator system.

A portion of the disclosure of this patent document contains material which is subject to copyright protection. The copyright owner has no objection to the facsimile reproduction by anyone of the patent document or the patent disclosure as it appears in the Patent and Trademark Office file or records, but otherwise reserves all copyright rights whatsoever.

Overview

It is desirable to monitor the time, speed, location, and acceleration of a motor vehicle or other asset, the calibration of said system and method, the use of said system and method to determine driving habits of drivers of said motor vehicles, and to detect abnormal vehicle events such as a collision or vehicle roll-over, monitor fuel consumption of the vehicle, etc. The measurement of such driving metrics allow operators to have insight into their mobile assets and driver behavior, allowing management of such things as vehicle operating cost and insurance premiums.

Devices such as the WebTech Wireless Locator Series perform such functions. The small and discrete tracking device is installed inside a vehicle or mobile asset. Operating over several communications standards (including GSM/GPRS/EDGE and Satellite), devices such as the WebTech Wireless Locator provide access to various applications, ranging from Internet-based tracking and mapping to vehicle diagnostics, location and tracking, and telemetry applications.

The present invention is ideally used in conjunction with a telematics information management system (herein, "IMS"). An example of an IMS is Quadrant, a web-based Fleet Management Solution service offered by WebTech Wireless Inc., and includes a back-end server communicating with Locators in the field, and a GUI based interface for use by customers of the service. Quadrant is a host-based application that, in conjunction with remote Locator technology, provides features such as: Vehicle Dynamic Events Monitoring; Automatic Vehicle Location (AVL) Operations such as Mapping and Reporting; Driver Status, Driver logs; In-Vehicle Telemetry; Vehicle Maintenance; and Two-way Messaging, Fleet Management.

Herein, the term "Locator" refers to an Automatic Vehicle Locator (AVL) with the addition of acceleration sensing technology, that is installed in a vehicle or any other mobile asset that experiences acceleration; and also includes, where the context herein permits or requires, the physical housing therefor. Further details of Locator 10 are explained below. An example of a Locator is the WT7000 series of devices, made by WebTech Wireless Inc.

AVL is a means for automatically determining the geographic location of a vehicle or other mobile asset, and transmitting the information to a requester. The location is commonly determined using GPS, and the transmission mechanism is a satellite, terrestrial radio or cellular connection from the vehicle to a radio receiver, satellite or nearby cell tower. Other options for determining actual location, for example in environments where GPS illumination is poor, are dead reckoning, i.e. inertial navigation, or active RFID systems or cooperative RTLS systems. With advantage, combinations of these systems may be applied. In addition, terrestrial radio positioning systems utilizing an LF (Low Frequency) switched packet radio network are alternative to GPS-based systems. After capture, the tracking data is transmitted using any choice of telemetry or wireless communications systems.

The acceleration sensing technology of the Locator allows for the detection, recording, and reporting of accelerations (and decelerations—note that a deceleration is equivalent to an acceleration of the same magnitude in the opposite direction, and the use of the word "acceleration" can mean a positive acceleration or a negative acceleration, or deceleration) of the vehicle or other mobile asset in which it is installed. It is also capable of actively monitoring vehicle accelerations for the purpose of detecting hard braking, excessive lane change maneuvers and rollover. During normal (active mode) of operation, the accelerometer option can report accelerations exceeding a threshold, or the current vehicle acceleration (logging operation), via independent report or the Locator trip recorder.

The acceleration sensing technology or accelerometer is a conventional, three axis (or tri-axial) acceleration sensor (or its equivalent—a combination of three single axis sensors or of a single axis sensor and a double axis sensor, the axes being of a X-Y-Z Cartesian coordinate system). Such a sensor would be installed in the Locator, which is then installed in a vehicle.

A major difficulty with such systems is the installation of the accelerometer such that its Cartesian frame of reference is exactly aligned with the vehicle frame of reference. The process of aligning the accelerometer sensor axes with the vehicle axes is referred to herein as "transform calibration".

Ideally, transform calibration is physically accomplished where the Locator is placed in the vehicle and the installer manually aligns it such that the axes of the accelerometer are aligned with the axes of the vehicle. But this is seldom possible for a plurality of reasons, including: the sensor installation (of the printed circuit board) in the Locator has physical errors due to misalignment of the MEMS sensor in the integrated circuit and to the integrated circuit installation on the printed circuit board; the printed circuit board may have an alignment error with housing of the Locator; it is impossible to align the Locator sensor axes and the vehicle axes due to the lack of a suitable mounting surface on the vehicle; and the installer may be relatively unskilled and not able to achieve proper alignment during the installation.

For these and other reasons, it is desirable to automate the alignment of the Locator. The operation would be performed such that the alignment between the accelerometer (Locator) coordinate system and the vehicle coordinate system is achieved: (a) with minimal human intervention by the installer, and (b) without the requirement to align the Locator hardware unit in a very specific manner in the vehicle (which may be not possible, depending on the form factor of a given vehicle).

Such a transform calibration would use coordinate transformations to calibrate the accelerometer (and Locator) in 3-axes such that the accelerometer coordinate system is aligned with the Cartesian coordinate system of the vehicle; making the transformed accelerometer measurements appear as if they were measured along the axes of the vehicle's Cartesian coordinate system.

Two automated methods of performing transform calibration are presented herein.

"Auto Calibration" is performed by the installer driving the vehicle and is completed in a short period of time (1-5 minutes).

"Self Calibration" is performed by the vehicle's owner and/or regular driver, and takes longer to perform (can be hours or days).

Active Acceleration Monitoring must be capable of monitoring and performing the following tasks: Hard braking, hard acceleration; Hard/Excessive lane changes; Vehicle rollover; Driver Behavior (statistical analysis); Report generation, in the form of a binary or character-based message; Provision of data to the trip recorder; Transmission of Reports concerning the following: Polled reports, showing current acceleration vector, including 1 G gravity contribution; Alarm report for excessive acceleration violations while Locator is active; Alarm report for positional violations (vehicle rollover while being driven); and Report of statistics.

Detailed Description

In the present invention, several preferred embodiments are described for illustrative purposes. FIG. 1 shows a schematic block diagram of a Locator 10 of a vehicle monitoring and calibration system according to the present invention for installation in a vehicle. There are several sources of error that can be caused by installation of the Locator in the vehicle: the orientation error of Locator 10 frame of reference relative to the vehicle frame of reference; and the positional offset of Locator 10 from vehicle's center of rotation when turning. The first type of error is mitigated by performing a calibration sequence on Locator 10. The second type of error is mitigated by recognizing and approximating the effects of the turn and removing those approximated effects in the acceleration calculations. This invention addresses these two types of errors in turn, later on below.

Locator 10 includes several subsystems: Power Conditioning 4; Computer 2; Memory 1; External Input/Output Interface 3; Location 5; Wireless Modem 7; Accelerometer 6; System internal data and power bus 11; Location antenna 8; Wireless Modem antenna 9; Ignition sense interface 13; and External Input/Output Interface 14.

Power Conditioning subsystem 4 interfaces to an external power source 12 such as a vehicle battery or other external power source. It regulates the external power source to voltage levels required by the other subsystems in Locator 10, provides transient protection, and can provide brownout or blackout protection using a backup battery.

Computer subsystem 2, with its own memory element, operating system and applications to performs the operational functions of Locator 10 described herein, including such things as self-test functions, data logging, networking to external servers using Wireless Modem subsystem 7, and an inter-process communications resource called herein, "Data Services".

Memory subsystem 1 consists of non-volatile storage, such as FLASH memory, to store data and events logged by Locator 10 system. It can also store configuration parameters used in the accelerometer alignment process.

External Input/Output 3 subsystem provides interfaces to external digital and analog devices and technologies, including: Onboard Diagnostics Gateway such as OBD-II, Panic Button, Bluetooth, Temperature Monitor, Telemetry I/O (i.e. Door Lock, Vehicle enable/disable, etc.).

Wireless Modem subsystem 7 consists of one or more wireless modem to interface to a variety of wireless network standards. Wireless Modem subsystem 7 is connected to its antenna 9. Typical wireless networks could be terrestrial or satellite based, such as GSM, GPRS, CDMA, HSDPA, HSPA+, HSUPA, UMTS, EDGE, Iridium, WiFi, Bluetooth, Zigbee, or proprietary wireless data networks. Such a wireless subsystem provides a data connection between Locator 10 system and a IMS.

Locator Location subsystem 5 provides information on such things as the coordinates (latitude and longitude), speed, elevation, time, heading, and other geo-spatial information for Locator 10 system. The Location subsystem 5 is connected to its antenna 8. Such geo-spatial positioning information can be provided by a GPS device, GLONASS device, devices based on the European Union's Galileo system, or other future Global Navigation Satellite Systems.

The Accelerometer subsystem 6 is a device that measures vehicle acceleration in one or more axes. Each axis measures the acceleration in a desired direction. Normally, the desired directions would be one of more of the following axes: Vertical (perpendicular to the plane of the surface of the Earth), Longitudinal (along the direction of travel of the vehicle), Lateral (perpendicular to the Longitudinal and Vertical axis).

Numerous devices are available to measure acceleration in one or more axes. Ideally, the measurement of the accelerations in all three axes provides a complete description of the accelerations experienced by the vehicle. For example, such a device is the Bosch Sensortec SMB380 Triaxial Acceleration Sensor. This device is a three axis (X, Y, and Z in the Cartesian reference frame) low-G acceleration available in an integrated circuit incorporating a three-channel Micro-Electro-Mechanical (MEMS) sensing structure. Herein, this functionality, Locator Accelerometer subsystem 6 is sometimes referred to as "accelerometer IC" 6, although there is no necessity of embodying in an Integrated Chip form.

All of the aforementioned subsystems are integrated into a single housing that is installed in a vehicle, and then calibrated to align the accelerometer data with the vehicle Cartesian axes. Locator 10 system is physically attached to the vehicle. Once attached to the vehicle, the accelerometer axes are not necessarily aligned with the longitudinal, lateral, and vertical axes of the vehicle. A coordinate system transformation is performed on the measured accelerometer data such that the outputs of this transformation are the true accelerations along the longitudinal, lateral, and vertical axes of the vehicle. One such transformation to accomplish this is the Euler Rotation Matrix. To use such a rotation transformation, it is necessary to determine the three Euler angles of the rotation matrix. The Euler rotation transform matrix T is represented by the following matrix product of three rotation matrices:

$$T = \begin{bmatrix} \cos\phi & \sin\phi & 0 \\ -\sin\phi & \cos\phi & 0 \\ 0 & 0 & 1 \end{bmatrix} \begin{bmatrix} 1 & 0 & 0 \\ 0 & \cos\theta & \sin\theta \\ 0 & -\sin\theta & \cos\theta \end{bmatrix} \begin{bmatrix} \cos\psi & 0 & \sin\psi \\ 0 & 1 & 0 \\ -\sin\psi & 0 & \cos\psi \end{bmatrix}$$

where the Euler angles are:

φ (phi) represents rotation about +Z axis in Locator 10 coordinate system (yaw)

θ (theta) represents rotation about +X axis in Locator 10 coordinate system (roll)

ψ (psi) represents rotation about +Y axis in Locator 10 coordinate system (pitch)

The angles θ and ψ in the second and third rotation matrices are determined during the Static phase and the angle φ in the first rotation matrix is determined during the Dynamic phase (as will be explained elsewhere).

Conversion of the acceleration vector in Locator 10 system frame of reference $A_L$ to the Vehicle Frame of reference $A_V$ is accomplished through the following vector multiplication:

$$A_V = T \cdot A_L$$

where the vehicle acceleration vector $A_V$ consists of the three Cartesian components ($A_{VX}, A_{VY}, A_{VZ}$), and Locator 10 acceleration vector $A_L$ consists of the three Cartesian components ($A_{LX}, A_{LY}, A_{LZ}$). The elements of Locator 10 Cartesian vector ($A_{LX}, A_{LY}, A_{LZ}$) are the outputs of the tri-axial acceleration sensor.

After installation of Locator 10, it is necessary to determine the Euler Angles φ, θ, and ψ such that the transformation matrix T can correctly transform the measured accelerations by Locator 10 $A_L$ to the vehicle reference accelerations $A_V$. This process is referred to as the transform calibration. A separate calibration step, referred to as the slope compensation calibration, is also performed.

Figure 10:
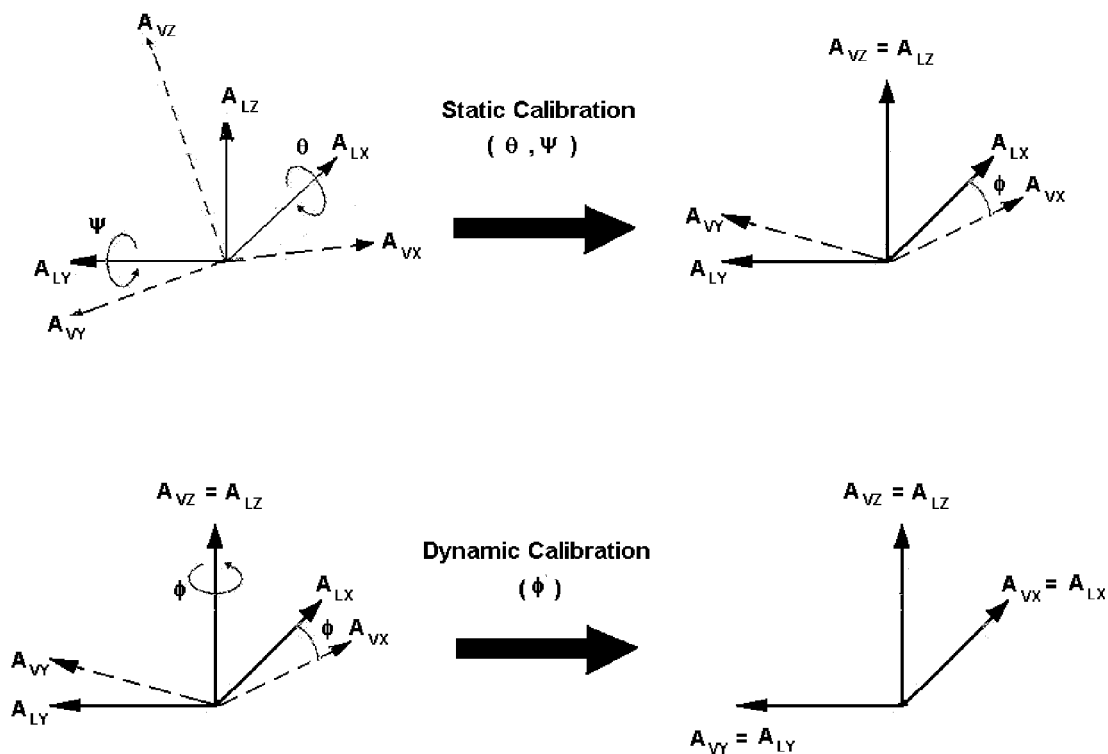
FIG. 10 shows the Static Calibration of the pitch and roll angles $\psi$ and $\theta$, and the Dynamic Calibration of the yaw angle $\phi$.

Locator 10 transform calibration occurs in two distinct phases. In the first (static) phase, the roll and pitch angles θ and ψ are estimated. This phase aligns the vectors $A_{VZ}$ and $A_{LZ}$. In the second (dynamic) phase, the yaw angle φ is estimated. This phase aligns the vectors $A_{VX}$ and $A_{LX}$ and the vectors $A_{VY}$ and $A_{LY}$. This two-phase calibration process is shown in FIG. 10. Once calibrated, Locator 10 accelerations $A_L$ are transformed to the Vehicle accelerations $A_V$ such that they represent the true accelerations experienced by the vehicle.

The slope compensation calibration is performed midway in the transform calibration to take advantage of conditions required by the static phase of the transform calibration; conditions that are also required by the slope compensation. Specifically, these conditions are that the vehicle undergoing installation is stationary on a plumbed surface.

The Installation Process

The Installation process consists of three basic, sequential steps: Physical/electrical installation of Locator 10 in the vehicle or platform; Calibration of Locator 10 system and then Normal operation of Locator 10 System.

Locator 10 is installed into the vehicle (usually under the front dashboard or some other location in the driver compartment) and is electrically connected to the vehicle and (if configured) the external GPS and Wireless Mobile Network (such as CDMA, GSM, EDGE, and others) transceivers. The installation is performed in a manner to securely fix it to the vehicle chassis or cab to prevent independent movement of Locator 10 from that of the vehicle.

All calibration (transform and slope) must be undertaken in this phase. The intent of this process is to mathematically orientate Locator 10 with the vehicle such that acceleration in the x-axis represents only forward and backward motion of the vehicle in a straight line (longitudinal axis) and acceleration in the y-axis represents lateral vehicle acceleration to the left or the right of the vehicle (lateral axis).

Once calibration is completed, then normal (calibrated) operation can commence. An option is available to recalibrate Locator 10 from the normal operating mode.

Figure 2:
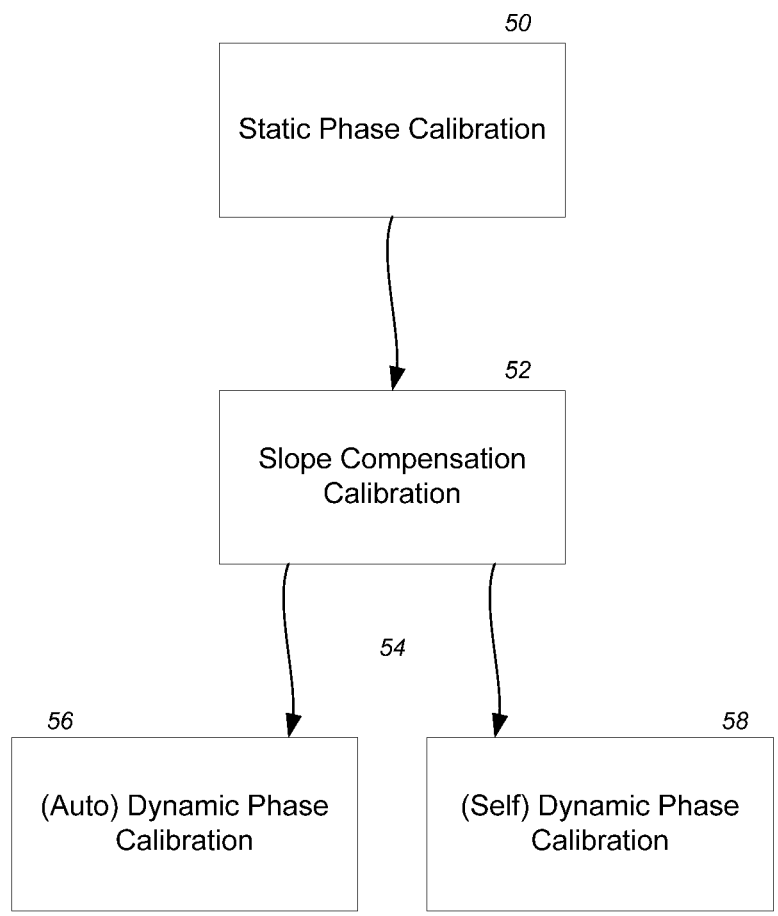
FIG. 2 shows the overall Calibration process.

The Calibration Process is described in FIG. 2, and consists of three phases, with the last phase having two separate modes of operation:

Static Phase of Transform Solution Calibration 50

Slope Compensation Calibration 52

Dynamic Phase of Transform Solution Calibration 54 (with Auto Mode 56 and Self Mode 58)

Both Auto 56 and Self 58 calibration modes share the same Static Phase of Transform Solution Calibration 50. In the static phase, a subset of the transform solution is computed while the vehicle is stationary and on a plumbed surface.

Slope Compensation Calibration 52 is done after the static phase 50 is completed. Slope compensation calibration requires the vehicle to be in the same state as the Static Phase does. This process will be described in more detail below.

The Calibration Process will proceed into the dynamic phase of calibration 54, based on the form of calibration selected, either Auto 56 or Self 58.

Accelerometer Transform Calibration

Determination of the transform solution can be solved in one of two available methods: auto calibration and self calibration. The next two sections cover basic flow of these two processes. Additional sections and figures will be referenced to provide more detail on phases common to both forms of transform solution calibration and to phases requiring more explanation of process and flow. In addition, the slope compensation calibration step, also common to both methods, will be explained below.

(I) Auto Calibration Process

Figure 3:
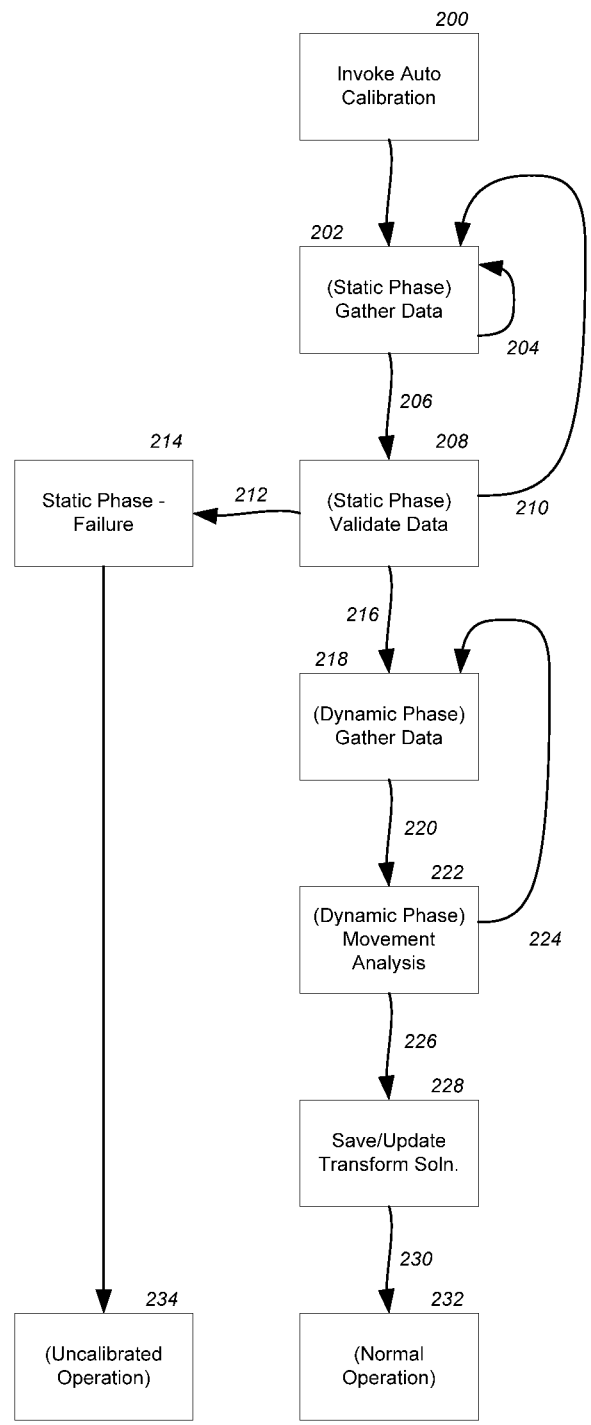
FIG. 3 shows the Auto Calibration process.

The Auto calibration process is described in FIG. 3.

Auto calibration is one of the two non-manual transform calibration methods available to the installer. This method differs from self calibration in the way that it determines the yaw correction angle (φ). Auto calibration determines the solution faster than self calibration, however it requires technical assistance from the installer who must move the vehicle in a proscribed manner. In some cases, it is undesirable to allow the installer to move the vehicle, and in such case, the alternate, self calibration method is used.

Figure 5:
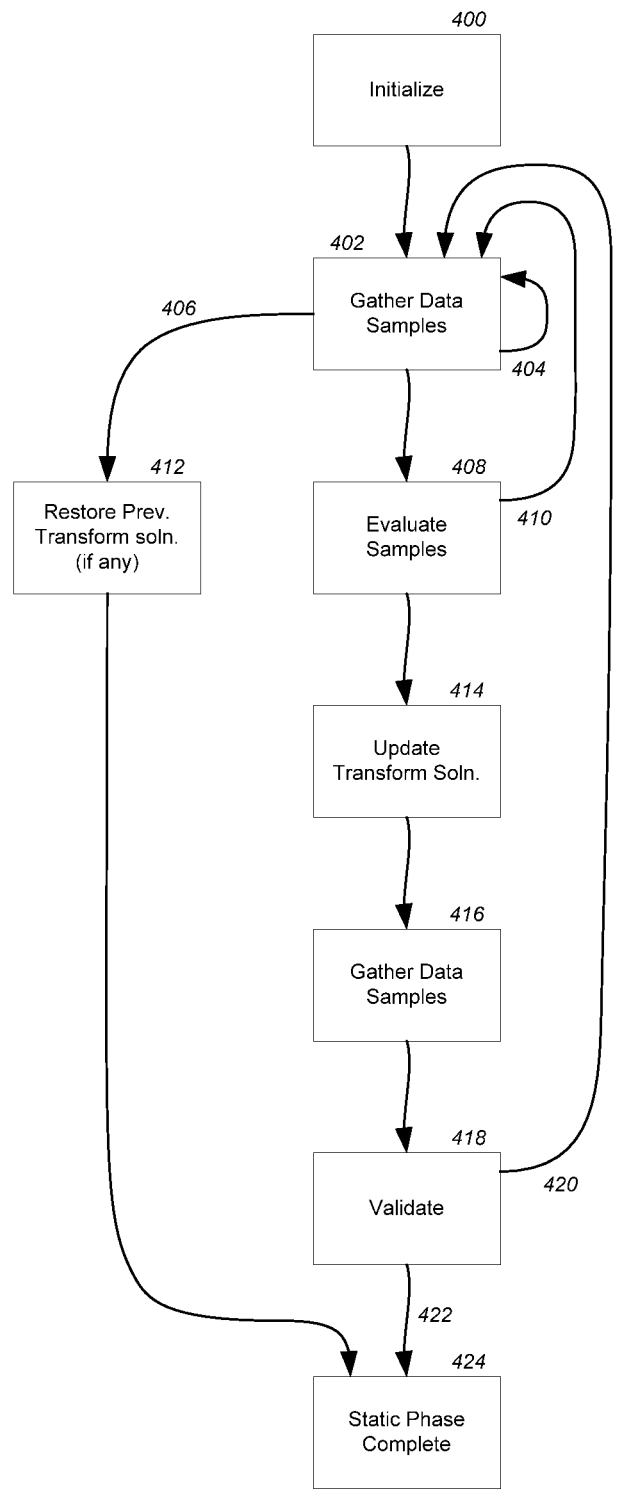
FIG. 5 shows the detail of the Static Phase Calibration process flow.

FIG. 5 explains the static phase of calibration used in auto calibration 202, 204, 206, 208, 210, 212, 214.

Figure 6:
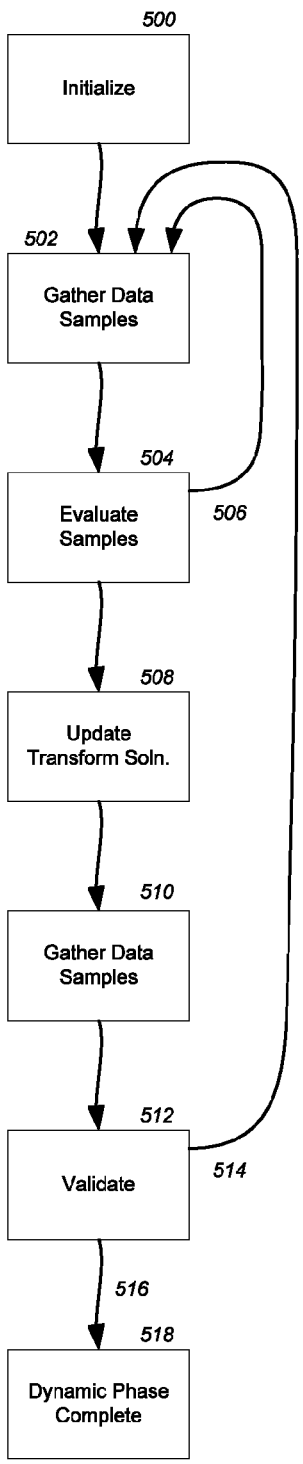
FIG. 6 shows the detail of the Auto Mode Dynamic Phase Calibration process.

FIG. 6 explains the dynamic phase form of calibration used in auto calibration 218, 220, 222, 224, 226.

200—Auto (Transform Solution) Calibration is initiated via local or remote command to Locator 10. At this point, normal operation is halted if the accelerometer was previously calibrated. Flow then moves onto the first stage of calibration, the static phase.

202—Static phase calibration is concerned with determining two of the three transform solution angles. It is a common method used in both forms of transform solution calibration and is discussed in more detail in FIG. 5. The end result of a static phase calibration is an alignment of the vehicle frame and Locator frame z-axes. The first part of static phase calibration is the collection of data points for analysis.

204—A requirement of the static phase analysis is that Locator 10 (and vehicle) must not be moving. If any Locator 10 movement is detected during the data gathering phase 202 then all data gathered is thrown out and step 202 is started again. This can be repeated a preset number of times, after which the static phase of calibration will fail and report the failure to the IMS, using the available method of communication (GPRS, satellite, WiFi, etc). The system then reverts to normal (un-calibrated) operation.

206—Data is then used to generate and validate a solution 208, once a sufficient amount has been gathered.

208—The validation stage will generate solutions for two of the transform solution angles, apply them to the transform and then validate the transform by gathering more samples (port transform update) and verify that X and Y accelerations are approximately zero in magnitude.

210—If the validation fails, then the process reverses changes made to the transform and goes back to step 202.

212—A failure in a combination of validation or data gathering for a finite number of attempts in a row will cause an abort of the calibration procedure.

214—The static phase of calibration can fail after a preset number of retries. The failure is due to Locator 10 and/or vehicle movement that is unacceptable at this stage of calibration. A message is issued to the IMS where it can be addressed. Calibration can be restarted once the problem is resolved.

216—Correct validation of the static phase will cause the calibration process to enter the dynamic phase.

218—Collection of acceleration data in the dynamic phase is similar to step 202 with the exception that vehicle movement is now expected.

220—The dynamic data gathering phase 222 will not finish until sufficient data has been gathered showing Locator 10/vehicle in movement; otherwise the auto calibration is aborted.

222—Dynamic phase acceleration data is used to determine the third (yaw) angle in the transform solution. After determining the angle, the transform is updated and a further set of acceleration data is accumulated to validate the third angle. This phase of operation is very quick and so it is the intent of the stage to gather data from the same vehicle motion that was used to generate the solution. FIG. 6 shows this form of the dynamic phase transform solution calibration in greater detail.

224—Validation failure will cause the process to go back and repeat the dynamic phase of calibration, starting from step 218. There is no limit to the number of times this validation rejection can occur. The dynamic phase can be aborted by re-issuing the command to initiate (either auto or self) calibration, or by pre-programmed reaction to a vehicle ignition off.

226—Validation succeeds if the y-axis component of acceleration is very small when compared to the x-axis of acceleration.

228—The final transform solution is saved into working memory and a report is sent back to the IMS, indicating success. The IMS can approve the results and issue another command to permanently save the solution.

230—Completion of the calibration will set internal flags to indicate that the accelerometer systems transform is now calibrated.

232—The accelerometer system, upon calibration success, will leave the calibration phase and resume normal operation.

234—While the problem of vehicle motion during the static phase of calibration still exists, see steps 202 and 208, the accelerometer system will run in an un-calibrated state.

(II) Self Calibration Process

Figure 4:
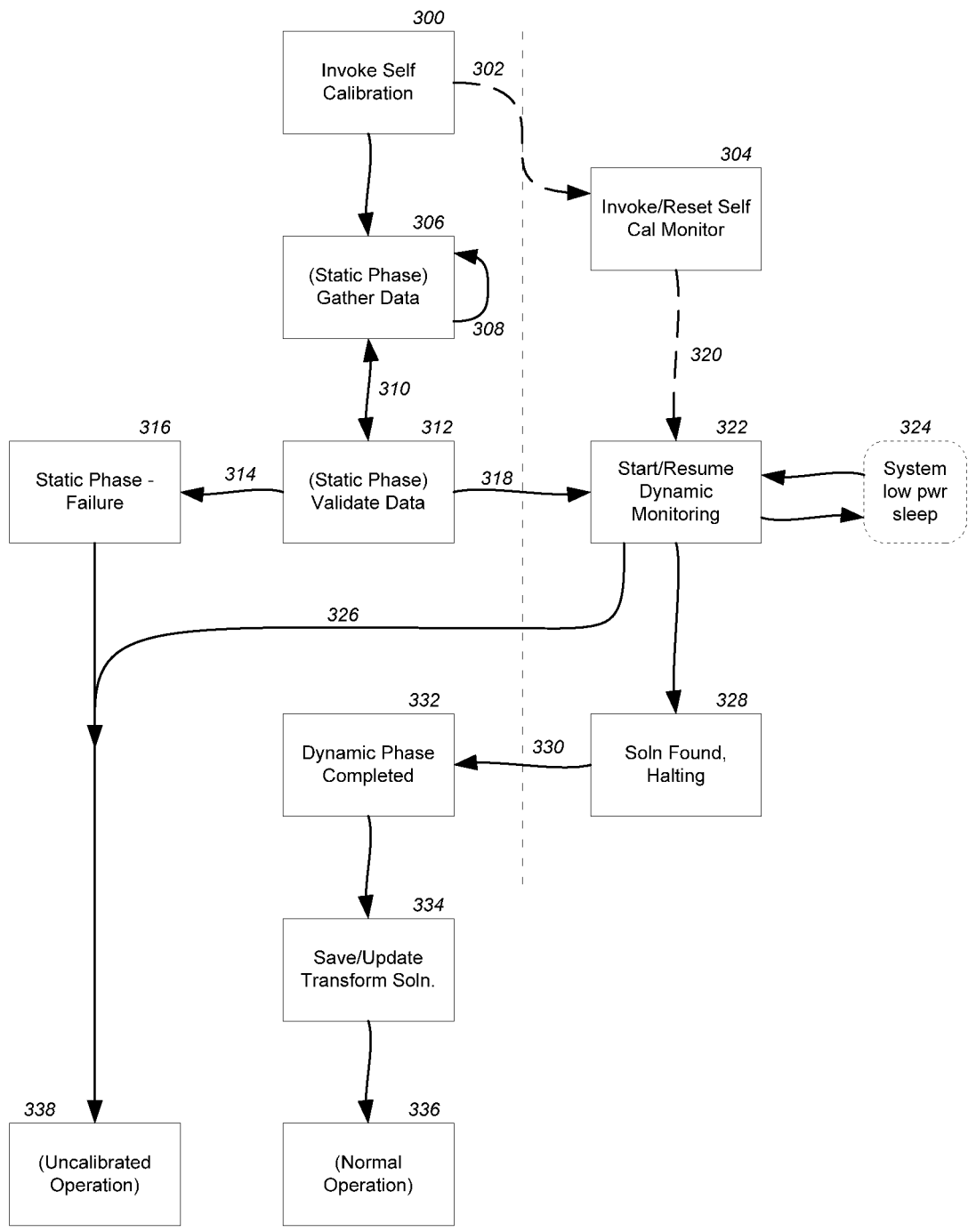
FIG. 4 shows the Self Calibration process.

The Self Calibration Process is described in FIG. 4.

Self calibration is one of the two non-manual transform calibration methods available to the installer. This method differs from auto calibration in the way that it determines the solution to the yaw correction angle (φ). The process of determining the yaw angle solution takes longer to perform than that of the auto calibration dynamic phase. The advantage of the self calibration process is that the installer is not required to move the vehicle. The owner (or designated driver) of the vehicle undergoing installation will move the vehicle to an installation location. This location must be validated as acceptable for performing the static phase of calibration performed in this process (i.e. a plumbed surface). Once installation is completed, the driver starts the vehicle (which completes the static phase of this process) and drives away. As the vehicle is driven in the following days, the self calibration's dynamic phase process develops the yaw correction angle solution, through a Gradient Descent algorithm, until the gradient error is acceptable.

Figure 12:
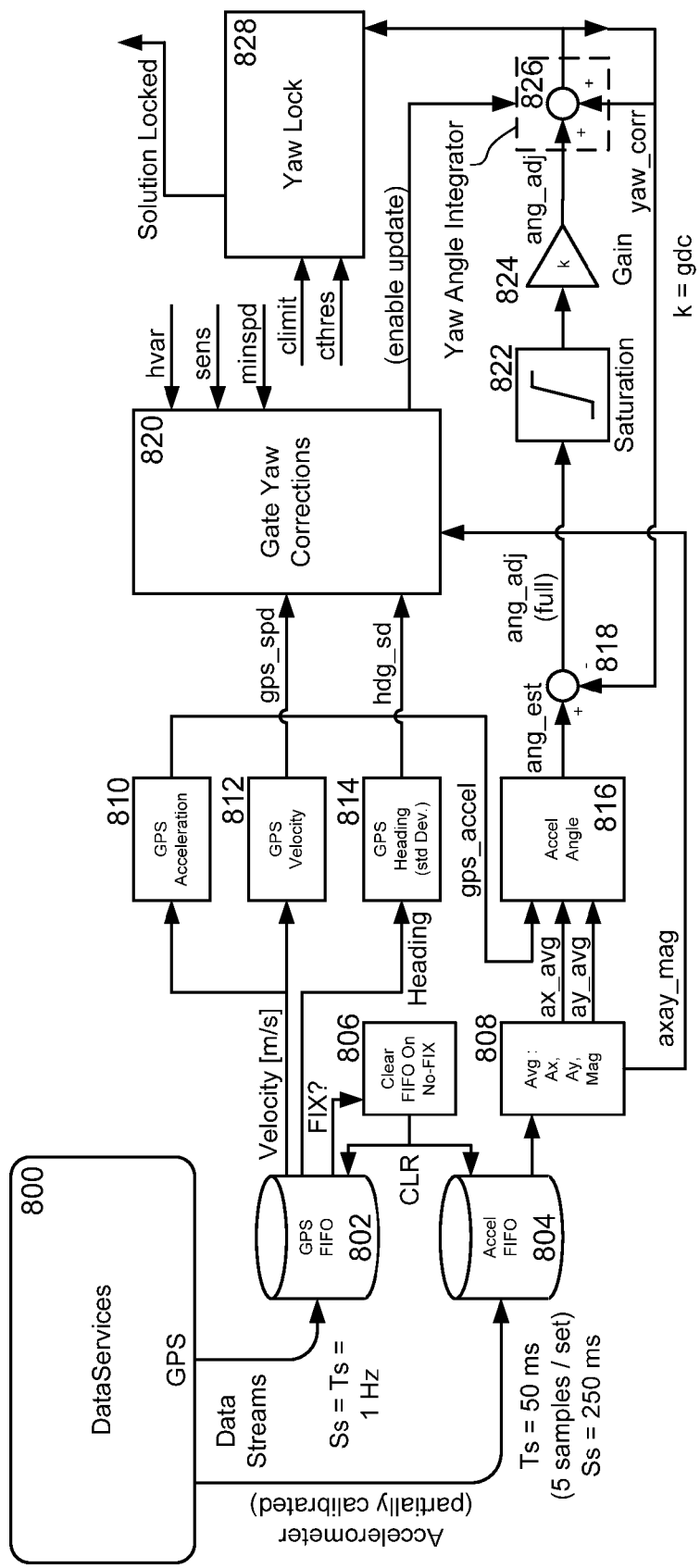
FIG. 12 shows the Self Calibration dynamic phase flow diagram.

The self calibration dynamic phase process and Gradient Descent Analysis is discussed in conjunction with FIG. 12.

The flow of the dynamic phase operation is discussed in connection with FIG. 7.

300—Self calibration is initiated by direction of the installer (or remote operator) and will direct the start of the static phase of calibration.

302—Invoking self calibration will direct the initialization of the self calibration monitor.

304—Configuration of the self calibration monitor, responsible for finding a yaw angle solution, involves enabling the monitor such that it will remain running though firmware restarts caused by vehicle ignition cycles and resetting of parameters used in the dynamic phase operation. An ignition cycle is the duration in which a vehicle is operating with the ignition system enabled. Locator 10 is active during the ignition cycle and can be programmed to stop execution of software, such as accelerometer calibration, outside of an ignition cycle.

306—Static phase calibration is identical to that used in auto calibration. See 202, 204, 206, 208, 210, 212 and 214. FIG. 5 explains static phase operational flow in more detail.

Figure 11:
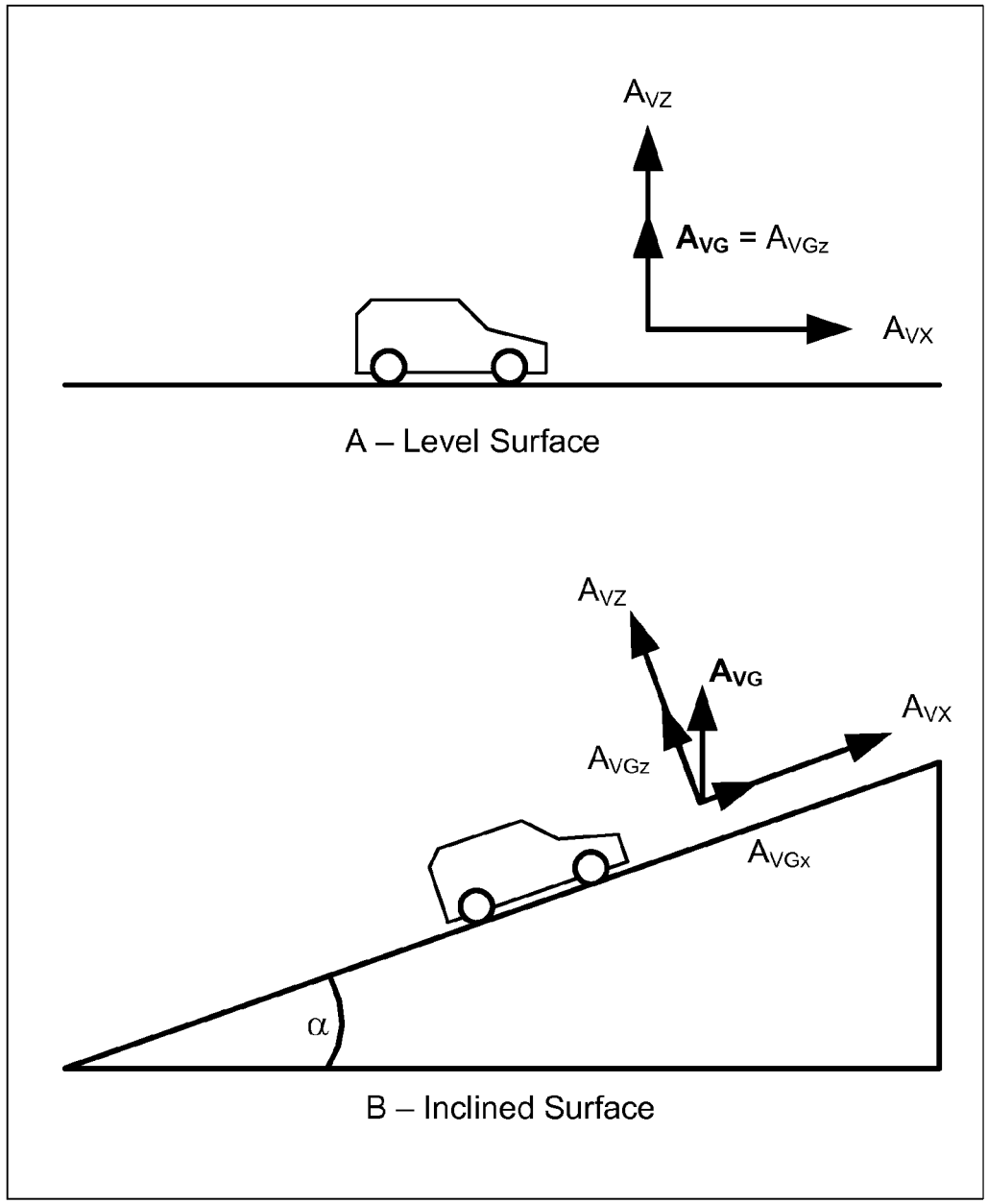
FIG. 11 shows geometric aspects of the Slope Compensation calibration process.

308—Static phase calibration is validated. If valid, then a slope compensation calibration, shown in FIG. 11, is performed, and dynamic phase operation begins 318. Static calibration is allowed to fail for a limited number of times before the self calibration process aborts 314.

310—Static phase calibration is explained in more detail in FIG. 5. Static phase operation will gather samples then validate them. If the samples show vehicle movement then the validation rejects the solution and the sample gathering phase 306 is re-started. In case of too many validation failures, the calibration process is aborted 314.

312—Static phase calibration is explained in more detail in FIG. 5. Validation is performed on static accelerometer data. If vehicle movement is detected then the samples are rejected 310,306. If validation is rejected too many times then the entire process is aborted 316. On validation success, a slope compensation is performed and the dynamic phase of calibration begins 318.

314—Enough static phase validation failures will cause the self calibration process to abort 316.

316—Failure to perform a valid static phase of calibration will cause the self calibration process to abort. A message is sent back to IMS informing of the failure. The installer is contacted about the failure and attempts to rectify the problem (loose installation, etc.). Once the root cause is determined, then self calibration can be re-initiated. Static phase calibration takes little time to run, and is most commonly performed under guidance by the installer as part of the installation validation.

318—A correct validation of the static phase of calibration, and a slope compensation cycle 312 will trigger the start of the dynamic phase of calibration, performed by the self calibration monitor.

320—The self calibration monitor remains ready to start and only awaits a signal from the accelerometer system to begin operation. See 318.

322—Dynamic self calibration monitoring begins. This phase of operation remains running until a yaw angle solution to the misalignment is found. Refer to FIG. 12 and associated text for an explanation of the dynamic self calibration process. Dynamic phase calibration flow is described in FIG. 7 and associated explanation.

324—The dynamic monitoring process is capable to tolerating interruption of operation (software stop and restarts) caused by vehicle ignition cycles placing Locator 10 into a low power sleep mode.

326—The Self calibration monitoring may be halted, under direction of a remote operator. If so, then the self calibration process aborts and the accelerometer software reverts to an un-calibrated operating mode 338.

328,330—When the dynamic phase monitor determines a yaw angle solution, then the monitor will halt itself and pass this information back to the main accelerometer process for integration of the solution into the transform.

332,334—Completion of the dynamic phase in the main accelerometer process involves updating the transform solution, updating the transform and flagging the accelerometer as calibrated.

336—Normal operation of the accelerometer software resumes under a calibrated state. Accelerometer data begins to flow to other software components.

338—Aborting the calibration process will place the accelerometer software into an un-calibrated state. Only a limited amount of (un-translated) data is available in this mode—it is mainly for other components such as the self calibration monitor.

Static Phase Calibration—Detailed Description

The Static Phase Calibration is shown in FIG. 5 and associated explanation.

400—Static phase calibration parameters are initialized, ready for a new cycle.

402—A fixed number of accelerometer data samples ($A_{XL}$, $A_{YL}$, $A_{ZL}$) are accumulated. Accumulated data samples should only comprise acceleration components from gravity, so the samples are tested against a valid magnitude range, allowing some tolerance around the expected value of 1 G projected onto the appropriate axis.

404—Samples are rejected if they display any form of vehicle motion 402. Such rejected samples could arise if the vehicle was not stationary, not on a level surface, or the vehicle was vibrating or rocking.

406—The calibration phase will abort (fail) if the data collection phase cannot accumulate any data showing that the vehicle (or Locator) is stationary. A finite number of attempts are tried.

408—Evaluation of samples will result in the generation of a mean acceleration vector. This vector is used as a benchmark to compare all of the gathered samples for testing variance. If too much variance is found in the gathered samples then they are rejected 410. Once variance is accepted, the mean vector is used to calculate two of the transform solution angles ($\psi, \theta$).

410—Rejected samples in the evaluation phase 408 will result in the process going back and re-attempting to gather samples 402.

412—Failure for the static phase to gather static acceleration values will cause the phase to revert to the previous transform solution (if any) and exit 424.

414—Once the two transform angles ($\psi, \theta$) are determined, they are used to update the transform solution. The third angle ($\phi$) is left unmodified (it will be adjusted in the dynamic phase of calibration using the adaptive yaw estimate algorithm).

416—Another set of samples is gathered after the transform has been updated.

418—The samples from 416 are checked in a validation stage. This stage looks at magnitudes of $A_{VX}$ and $A_{VY}$ which should be near zero (with some noise). Failure to validate will cause another attempt at static calibration 420.

420—Failure to validate the static phase calibration results will result in the transform and its solution being reset back to zero for all angles and another attempt to gather data samples 402.

422—Completion of validation is the last step in the static calibration process.

424—The Static phase of calibration will eventually terminate, either in a valid solution 422 or in failure 412.

Dynamic Phase Calibration—Detailed Description—Auto Mode

Dynamic Phase Calibration (Auto Mode) is described in FIG. 6 and associated explanation.

500—Initializing Dynamic phase calibration (auto mode) will read and save the yaw angle $\phi$ from the current transform solution and set the value in the solution to zero. The transform is then updated to this new solution.

502—Initial gathering of data is concerned with capturing vehicle movement for a sufficient number of samples. The process will remain in this step until it has data meeting the requirement. There is no limit to the number of retries.

504—Evaluation of the data samples will determine a mean acceleration vector and compare all vector samples to this mean, looking for samples falling outside of a preset variance limit. From the mean vector, the 2D vector in the XY plane is extracted and its angle from the $+A_{VX}$ axis is computed. The angle is used as a temporary yaw angle in the transform. A Face Vector (explained below) is translated using the new transform. The new face vector's X axis is examined. If the sign of this axis is negative then the temporary yaw angle is rotated by 180 degrees and is used as the calculated transform solution angle.

A Face Vector is a vector, described in Locator 10's reference frame, whose orientation is directed towards the front of the vehicle in which Locator 10 is installed. The determination of this vector is performed by the installer according to the way in which Locator 10 was oriented during the installation process. In the case of a six-sided right rectangular prism Locator housing, a Face Number is used to designate one of seven pre-programmed face vector orientations that can be selected—six standard physical sides (top, bottom and four sides of such a housing) and one virtual side (being a notional plane that cuts diagonally through Locator 10 such that all positive vectors ($+A_{LX}, +A_{LY}, +A_{LZ}$) lie on one side thereof, and all negative vectors lie on the other side). Thus, the seventh face number describes a vector of (1,1,1) in the $A_L$ coordinate system. This default Face Number is the most flexible, offering the installer the ability to install Locator 10 at any orientation inside of a hemisphere where the Face Vector remains (to some extent) pointing towards the front of the vehicle. As described above, the use of the Face Vector is to detect and correct yaw angle solutions that have aligned $+A_{LX}$ with $-A_{VX}$. The correction is to rotate the yaw angle solution by 180 degrees.

506—Samples not meeting the variance requirements in 504 will cause the process to repeat step 502. Retries can be unlimited or set to not exceed a maximum number of failures.

508—The new transform solution with the new yaw angle φ is loaded into the transform to ready it for more data sampling.

510—More data samples are gathered using the new transform. The previous stages will have taken a short time (typically tens of milliseconds) to perform and so the data gathered here should be part of the same vehicle motion that was captured in 502. Consideration is then made to be less stringent on the amplitude of the acceleration vectors and the number of samples required.

512—Validation of the data consists of the generation of a mean vector (if multiple samples are gathered) representing the orientation of acceleration in the XY plane of the vehicle's coordinate frame and determining the offset angle of the new vector, relative to the $+A_{VX}$ axis. Validation passes if the calculated angle is within a prescribed range of angles.

If multiple samples are gathered, the mean acceleration vectors $V_X$ and $V_Y$ are calculated:

$$V_x = \frac{\Sigma_n A_{Vx}[n]}{n} \qquad \text{Eqn. 1}$$

$$V_y = \frac{\Sigma_n A_{Vy}[n]}{n} \qquad \text{Eqn. 2}$$

The representative vector is then used to produce an estimate of the yaw angle φ:

$$\phi = \tan^{-1}(V_y/V_x) \qquad \text{Eqn. 3}$$

The validation succeeds if $\{\phi_{min} < \phi < \phi_{max}\}$ where $\phi_{min}$ is the most negative acceptable angle and $\phi_{max}$ is the most positive acceptable angle.

514—Failure of the validation in 512 will cause the entire process to repeat again at 502. There is no limit to the number of retries.

516—Success of validation 512 will bring this phase of calibration to a close.

518—Completion of the static and dynamic phases of calibration will mark the accelerometer process as calibrated. A message is sent to the IMS with the new transform solution (this implies that the dynamic phase has completed). The solution is readied for saving to permanent status. Final saving of the transform solution is initiated manually under direction of the installer, or remote operator.

Dynamic Phase Calibration Detailed Description—Self Calibration

Figure 7:
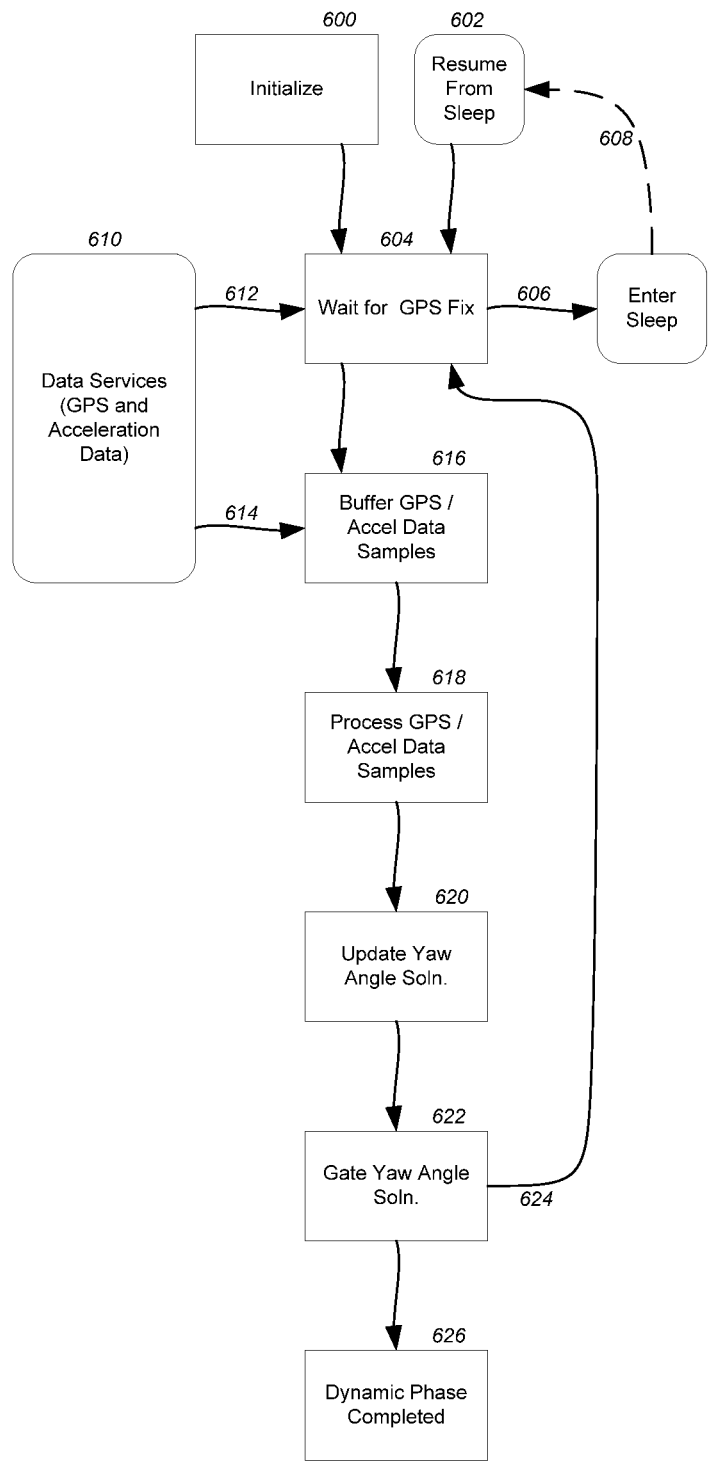
FIG. 7 shows the detail of the Self Mode Dynamic Phase Calibration process.

Dynamic Phase Calibration (Self Mode) is described in FIG. 7 and associated explanation.

This section explains more on the operation of the dynamic phase of transform solution calibration in self calibration mode. Refer to FIG. 12 for an explanation of the workflow for this process that can be used in software algorithm development.

600—The self calibration mode of the dynamic phase is intended to run independently from the main accelerometer system. The process described here is designed to withstand interruption from Locator 10 sleep cycles 606, 608, 602 caused by the vehicle ignition turning on and off. As this process is separate from the main Locator 10 applications, it requires a way of obtaining data and so it takes advantage of Data Services 610. During initialization, the run status of the process is made permanent so that it will restart when Locator 10 applications restarts. All local data is reset to its defaults.

The intent of this process is to determine the yaw correction angle for the transform solution, using a Gradient Descent technique. A discussion of the Gradient Descent method is discussed here.

A yaw angle misalignment will cause accelerations along either the x or y-axis to exhibit components in both axes rather than just one. If the direction of accelerations experienced by the vehicle is known, then a simple adaptive algorithm can be used to estimate the yaw offset φ and use this estimated value along with the pitch and roll compensations (θ and ψ) determined using the static alignment method to compensate the sensor for misalignment.

Many adaptive algorithms can be used for this problem, ranging from simple Gradient Descent (GD) means to advanced Kalman tracking means. The GD algorithm is simple, whereas more advanced ones require considerable processing bandwidth. Where the accelerometer sensor is not a precision scientific device and the alignment accuracy does not need to be highly accurate, a simple GD algorithm is appropriate.

Gradient Descent is a first-order optimization algorithm. To find a local minimum of a function using gradient descent, one takes steps proportional to the negative of the gradient (or the approximate gradient) of the function at the current point. If instead one takes steps proportional to the gradient, one approaches a local maximum of that function.

Gradient descent is based on the observation that if the real-valued function F(x) is defined and differentiable in a neighborhood of a point "a", then F(x) decreases fastest if one goes therefrom in the direction of the negative gradient of F thereat, $-\nabla F(a)$. It follows that, if $b=a-\gamma \cdot \nabla F(a)$ for $\gamma>0$ and a small enough number, then $F(a) \geq F(b)$. With this observation, one starts with a guess $x_0$ for a local minimum of F, and considers the sequence $x_0, x_1, x_2, \ldots$ such that $x_{n+1} = x_n - \gamma_n \cdot \nabla F$ (a), $n \geq 0$, so that $F(x_0) \geq F(x_1) \geq F(x_2) \geq \ldots$.

Thus the sequence $x_n$ converges to the desired local minimum. Note that the value of the step size $\gamma_n$ is allowed to change at every iteration, although it can remain fixed.

The yaw offset of the accelerometer as measured by the vehicle when undergoing longitudinal accelerations is:

$$\phi_n = \tan^{-1}(A_{LX}/A_{LY})$$

Using an adaptive algorithm such as Gradient Descent, successive estimates can be made of the yaw offset angle φ of Locator 10 relative to the Vehicle frame of reference. In the Gradient Decent algorithm, the adaptation coefficient γ is typically chosen to be small, and it is a tradeoff between the rate of descent and the estimate noise. Using a value of γ=0.02, the algorithm for estimating angle φ consists of successively evaluating φ based on successive measurements of the lateral and longitudinal accelerations $A_{LX}$ and $A_{LY}$ measured by the accelerometer in Locator 10. Each approximation of φ consists of the following steps:

$$\gamma = 0.02$$

$$\text{angle\_estimate} = \tan^{-1}(A_{Lx}/A_{LY})$$

$$\phi_{n+1} = \phi_n + \gamma \cdot \text{angle\_estimate}$$

In estimating the Yaw angle $\phi_{n+1}$, it is desirable to use only acceleration samples that represent a forward trajectory of the vehicle with no lateral acceleration. This is easily determined by using the vehicle heading acquired from Locator 10 Location subsystem 5. If the vehicle is traveling in a straight line along its X-axis, then the heading should not change and there will be no lateral acceleration. There will be some variation in the heading value, but this is typically the order of ±1 degree.

The simplest way to determine if the trajectory of the vehicle is straight, is to calculate the standard deviation of the variance of the vehicle heading for several consecutive GPS samples and compare it with a threshold value. If the measured heading variance is less than a preset threshold variance, it can be said that the vehicle is traveling in a straight line. Actual GPS data indicate that this variance threshold can be in the order of 1.5 to 2 degrees when the vehicle is traveling in a straight line.

The heading estimates from the GPS unit are only valid if the vehicle has a non-zero velocity. Accordingly, acceleration samples will only be used if the vehicle velocity is non-zero.

In addition to the previous criteria being met to adjust the yaw offset, adjustments will only be made when the magnitude of the acceleration measured in the XY plane ($a_x$ and $a_y$) is greater than some nominal threshold value. There is some natural "noise" in the acceleration data due to sensor noise, vehicle engine vibration, road induced vibration, and the like, so using this acceleration threshold is essentially requiring that $\sqrt{a_x^2+a_y^2} > a_{thresh}$. By using only sampled data which satisfies these criteria, the calibration system is using samples with a higher signal to noise ratio (the signal being the vehicle induced acceleration components and the noise being the other extraneous components). This threshold value would be non-zero, and is less than would be expected in a typical driving scenario. For vehicle under constant acceleration from 0 to 50 km/h over a 10 second period, the acceleration is the order of 0.14 G, so a threshold in the region of 0.05 to 0.10 would be reasonable. To give an idea of the accelerations involved, a vehicle accelerating from 0 km/h to 50 km/h over a 10 second period would experience accelerations the order of 0.14 G. The same vehicle doing this over a 2.9 second period (very aggressive acceleration) would experience the order of 0.47 G acceleration.

The Gradient Descent update of the yaw offset angle is only performed when the following three conditions are met:
  Variance of the heading less than a variance threshold
  Vehicle speed greater than some nominal threshold speed
  Magnitude of the x and y components of the acceleration greater than a nominal threshold value.

It is possible to use the yaw offset estimates determined during the static yaw alignment process as the initial estimate of the dynamic yaw alignment process. This will speed up the convergence of the GD algorithm to the maximum likelihood estimate. Such estimates could be obtained from positioning the vehicle on an inclined surface, making a visual estimate of the Yaw offset angle, or other means to get an approximate estimate.

602—Detection of a vehicle ignition on 608 causes Locator 10 applications to restart. This dynamic phase calibration process will restart, load in saved parameters and resume operation at 604.

604—The first stage in the processing loop is a check for good GPS data. The current status of the GPS is checked 612 to see if a satellite fix has occurred. If no satellite fix is found, then the process remains at this stage.

606—The detection of a vehicle ignition off will signal this process to save intermediate working parameters to non-volatile storage and operation halts. After a short delay, Locator 10 applications revert to a low power sleep mode.

608—Detection of a vehicle ignition on will trigger a resumption of normal operation in Locator 10 step 602.

610—This calibration process will register to receive two streams of information, GPS and (un-calibrated) accelerometer data. Data is received in this stage and pushed 612, 614 into the calibration process, triggering responses in 604 and 616.

612—GPS data consisting of time, latitude, longitude, speed, heading, and status is pushed to 604 to check GPS fix status.

614—GPS and accelerometer data is pushed to 616 to be accumulated.

616—Confirmation of satellite fix will cause the process to start buffering GPS and accelerometer data 614. Multiple samples of each are acquired, spanning several seconds of time. The data is synchronized such that a set of accelerometer data will match a single GPS location dataset, as accelerometer sampling is much faster than GPS sampling.

618—Accumulation of sufficient GPS and accelerometer data will allow the process to generate intermediate data from the samples. This data is used to: determine a yaw angle and determine the validity of the new yaw angle.

The determination of the yaw angle, and previously determined static phase angle pith and roll, is the core purpose of transform solution calibration. The mathematics behind determining these angles is explained below.

When the vehicle is stationary on a surface where the (X,Y) plane is perpendicular to the Earth's gravity vector G, the outputs of the accelerometer are due only to gravity and not vehicle dynamics. The corresponding outputs from accelerometers are used to perform leveling of the sensor frame of reference by removing the pitch and roll components of the misalignment. Yaw misalignment has no effect because the yaw offsets are about the Z axis. By comparing the outputs of three orthogonal accelerometers with gravity, the tilt angles between the vehicle frame and the sensor frame can be determined.

The gravity sensed by accelerometers in the vehicle frame is expressed as $A_V$, while the gravity in the sensor frame (that of Locator 10) is written as $A_L$. $A_L$ and $A_V$ are defined as:

$$A_L = [A_{LX}, A_{LY}, A_{LZ}]^T$$

$$A_V = (0, 0, G)^T$$

The relationship between $A_V$ and $A_L$ is formulated as:

$$A_V = T \cdot A_L$$

where T is the orientation transformation matrix from the $A_L$ frame to the $A_V$ frame, which can be formulated as:

$$A_{LX} = G \cdot (\cos \phi \sin \psi + \sin \phi \sin \theta \cos \psi)$$

$$A_{LY} = G \cdot (\cos \phi \sin \theta \cos \psi - \sin \phi \cos \psi)$$

$$A_{LZ} = G \cdot \cos \theta \cos \psi$$

For a vehicle at rest (no dynamic movements, accelerations, vibrations, etc.) on a flat surface that is perpendicular to the gravity vector, then we can choose any yaw angle that would simplify the above equations and solve for roll and yaw. If we choose $\phi = 0$, then the above equations reduce to:

$$A_{LX} = G \cdot \sin \psi$$

$$A_{LY} = G \cdot \sin \theta \cos \psi$$

$$A_{LZ} = G \cdot \cos \theta \cos \psi$$

Rearranging these we obtain:

$$\sin \psi = A_{LX}/G$$

$$A_{LY}/A_{LZ} = \sin \theta / \cos \theta = \tan \theta$$

These two equations do not contain the $\cos \psi$ term. This is because once the pitch and roll offsets have been compensated for, rotating the sensor about the vehicle Z-axis does not affect this alignment (the pitch and roll offset alignments are independent of yaw offsets). This allows us to solve these for ψ and θ as follows:

$$\psi = \sin^{-1}(A_{LX}/G)$$

$$\theta = \tan^{-1}(A_{LY}/A_{LZ})$$

A detailed view of the mechanics behind the determination of the yaw angle via self calibration is described in FIG. 12. In this diagram and description, a number of terms used to describe operation of this process are used;

Yaw (angle)—An angle, measured in degrees, describing the rotation about $+A_{VZ}$ required to translate Locator reference frame accelerations into the vehicle reference frame. It is measured relative to the $+A_{VX}$ axis and can range from 0 to ±180 degrees.

Yaw correction estimate—New estimates are generated every second in the dynamic self calibration process. These estimates consist of a set of data generated from information provided by Locator 10's GPS and accelerometer data streams. The estimates are validated by a gating mechanism and, if valid, are used to improve the yaw angle solution.

Yaw angle solution—This value is the measured estimate of the actual yaw angle. It represents a sum of the actual yaw angle plus some yaw error. The intention of the dynamic calibration process is to attempt to reduce the yaw error to a few degrees and then use the yaw angle solution to finish the transform solution calibration.

Yaw error—The angular difference between the yaw angle solution and the actual yaw angle. Applications of new yaw correction estimates strive to reduce this error over time to approach zero degrees, using a Gradient Descent approach.

Actual yaw angle—The angle representing the angular difference about $+A_{VZ}$ between the (modified) Locator frame of reference and the vehicle frame of reference. Locator 10 frame of reference has been modified by the two static phase rotations used to align the XY plane in both reference frames. Actual yaw angle is a theoretical angle and can only be represented in software by using an estimate, the yaw angle solution.

800—Data Services

All data required for processing and updating the yaw angle solution are provided by Data Services 800. These comprise the accelerometer and GPS services, and software subroutines operating within Locator 10. Data Services 800 generate data streams which deliver sample buffers, via interprocess communication resources available from Locator 10 applications, at a predetermined rate. The sample buffers will hold one or more data samples from the stream.

Sample rates are flexible, depending on the technology of the devices used in generation of the data. For example, the GPS part of Data Services could generate one sample per second, placing each sample into its own sample set. The accelerometer Data Services could generate 20 samples per second and then place five samples into each sample set. Sample sets are copied into separate data FIFOs 802, 804 that retain the latest samples from each stream.

Acceleration data samples are partially calibrated. The transform solution calibration process has already determined the two static angles in the static phase of calibration and adjusted the transform to use the two known angles with the third solution angle set to 0.

Yaw correction estimates are based on data spanning a period of three seconds. This data is held in two separate FIFOs, GPS Data Sample FIFO 802 and Accelerometer Data Sample FIFO 804, that retain the newest sample data. Once full, a FIFO will throw away the oldest sample when adding the latest (newest) sample.

The FIFOs can be cleared/zeroed; this can be decided by determining the GPS FIX status 806. If the GPS system has a position fix then the FIFOs are allowed to accumulate data. If GPS position fix is lost then data is cleared from the FIFOs, preventing invalid data from propagating further into the yaw correction process.

At present, a total of three GPS fixes are held in the GPS FIFO 802 while the Accel FIFO 806 is configured to hold 60 samples. A total of 20 acceleration samples are added for each GPS fix and a single new GPS fix is added every second.

The FIFOS are designed to allow receivers of the data 808, 810, 812, 814 to "peek back" into the FIFO and retrieve data newer than the current (oldest) sample available. This allows the FIFO to also be used as a time-based window when analyzing data over time.

808—Acceleration Averaging

Acceleration averaging occurs only when the Accel FIFO 804 is full. The process will take the oldest 30 samples and produce 3 averaged values; ax_avg, ay_avg and axay_mag representing the average vector Ax, Ay and the vector magnitude of (Ax,Ay). The average represents vehicle acceleration in the XY plane over a 1.5 second period.

810—GPS Acceleration

A GPS acceleration estimate, gps_accel, is generated from the GPS speed parameter inside the GPS data sample. This estimate is used to provide direction when computing a new accelerometer yaw correction estimate. The estimate is generated by subtracting the most recent GPS speed from the next-oldest sample of GPS speed in the GPS FIFO 802.

812—GPS Velocity

GPS velocity gps_spd is GPS speed from the oldest sample in the GPS FIFO.

814—GPS Heading

This computation is not actually concerned with the heading, merely the standard deviation of the three GPS heading data points in the GPS samples held in the GPS FIFO 802. The algorithm will rotate heading samples by 180 degrees if they are close to 0 or 359 degrees to prevent averaging problems when dealing with data close to the 0-359 degree discontinuity point. A standard deviation of all samples is then computed, creating hdg_sd.

Note: computation of standard deviation is complex. A shortcut to the calculation is performed by not calculating the square root of the summation (see below). Thus, hdg_sd actually represents the standard deviation squared. This is taken into account in the Gate process 820 by using the standard deviation squared threshold for the comparison.

$$\sqrt{\frac{\Sigma_n (S_n - \hat{S})^2}{n}} \quad \text{Standard Deviation Equation}$$

$$hdg\_sd = \frac{\Sigma_n (S_n - \hat{S})^2}{n} \quad \text{Form used to calculate hdg\_sd}$$

816—Accelerometer Angle Computation

This process is designed to determine a yaw correction estimate which represents the angle between the $+A_{VX}$ axis and a positive vehicle acceleration vector.

Computation starts by computing an angle, relative to the $+A_{VX}$ axis, from the data ax_avg and ay_avg from 808 to generate an initial value ang_deg. The GPS acceleration value gps_accel is used to determine if the vehicle movement represented by the acceleration average was an acceleration or deceleration (braking) action. If the vehicle was decelerating, indicated by a negative GPS acceleration, then the angle estimate is rotated 180 degrees.

In other words, braking maneuvers are converted to an equivalent acceleration maneuver and used to form a new yaw correction estimate. This allows both vehicle acceleration and braking to be used as information for determining the yaw angle solution.

The final output is ang_est; an absolute angle correction estimate.

820—Gating Yaw Correction

Three conditions of the current yaw correction estimate are used to determine the validity of the data. When all three conditions are met then the new estimate is used to correct the current yaw angle solution to reduce the yaw error.

The intention of the gate is to ensure that new estimates, ang_est, work to incrementally reduce the yaw error (the difference between the yaw angle estimate and the actual yaw angle). The three conditions are: heading variation, acceleration magnitude and minimum vehicle speed.

Heading Variation—The standard deviation (or square of standard deviation, see 814 for more information) of the three GPS heading samples, indicated in this document by hdg_sd is compared against a configuration parameter hvar. If hdg_sd is less than or equal to hvar then the condition for heading variation is met.

Acceleration Magnitude—Magnitude of the current acceleration vector sample, indicated by axay_mag 808, is compared against a configuration parameter sens. if axay_mag is greater than or equal to sens then the condition for acceleration magnitude is met.

Minimum Vehicle Speed—The vehicle speed, indicated by gps_spd 812, is compared against a configuration parameter minspd. If gps_spd is greater than or equal to minspd then the condition for minimum vehicle speed is met.

818—Determining Yaw Angle by Gradient Descent Method

New angle estimates from 808 are converted into an angle difference from that of the current yaw correction angle to produce ang_adj.

822—Angle Gradient Saturation

Each calculated angle adjustment, denoted by ang_adj (full), is saturated to a limit of ±22.5 degrees (adjustable) to prevent incorrectly assessed angle estimates (ang_est) from causing a large error being re-introduced into the yaw estimate yaw_corr. The result of the saturation is then attenuated in 824.

824—Angle Gradient Scaling

Saturated angle adjustments 818, 822 are scaled down by gain factor gdc. The scaling is adjusted to produce a good rate of convergence without taking too much time for the dynamic calibration process to complete. The result of this step is the angle adjustment ang_adj.

826—Yaw Solution Updates

The yaw solution, yaw_corr, is only updated by ang_adj 824 if the adjustment is validated. The validation process is termed "gating" is this discussion. See 820 for more information on how samples are gated. If a sample passes validation, then it is added to the current yaw solution, producing a new yaw solution which is saved.

828—Determining Yaw Lock

The intention of the yaw lock subsystem is to determine when yaw angle solution changes have stabilized. Detection of this event will trigger the acceptance of the yaw angle solution as the calibrated yaw angle φ.

Yaw lock is performed by examining the magnitude of the yaw correction error ang_adj over time. If the magnitude of this error is consistently below a set threshold cthresh for a minimum climit samples then the yaw angle solution is locked; no more new yaw correction estimates are generated and the angle is used as the final (dynamic phase) angle in the transform solution.

At this point the accelerometer software system is considered to be calibrated. As an option, this dynamic phase operation described here can continue operation, if monitoring is enabled. If monitoring is not enabled (it is off by default) then the dynamic phase of transform solution calibration is concluded.

Yaw Monitoring (Option)—After locking the yaw solution 828, the solution can be optionally monitored over a period of time, to determine the accuracy of the solution. The yaw solution is permitted to stay active, updating the solution for new yaw corrections, however the yaw angle is not used to change the transform solution derived before entering the monitoring phase. The yaw angle can be interrogated, via over-the-air commands from IMS while in the monitoring phase.

620—A new yaw angle that is deemed valid will be used to update the yaw angle solution. The new angle is range limited (hard limited) and then attenuated to reduce the affect it has on the final yaw angle. The final yaw angle is then updated. Repeating this process causes the final yaw angle to converge to a constant value over time.

622—As the final yaw angle is converging to a maximum likelihood estimate, the corrections made to it decrease. When these changes fall below a threshold then a gating process begins. Changes exceeding the gate amplitude threshold will cause the processing loop to repeat 624. When sufficient samples have passed the gating check then the final yaw solution is locked 626.

624—Corrections that do not meet the gating requirements trigger a loop back to the initial stage of the processing loop 604.

626—A gated final yaw angle is taken as the estimate for φ in the transform solution. This value is sent back to the main accelerometer process. The dynamic phase process is halted and the process is reconfigured such that it does not start on an Locator 10 applications (re)start.

Slope Compensation Calibration

The intent of slope compensation calibration is to create an upper and lower bound, based on transform calibrated output of a static (non-moving) vehicle and a maximum slope angle compensation value. It can be performed repeatedly by operator commands after the accelerometer has completed determination of the transform solution.

The routine determines when the vehicle is motionless and will then gather samples. A maximum range value (GV_max) is generated from the magnitude of $A_V$. A second minimum range value (GV_min) is then generated from GV_max and the cosine of the maximum acceptable slope compensation angle. The intent of GV_min is to limit slope compensation to a subset of slope angles.

It is a process that is required to ensure accuracy in the Slope compensation filter (ref. FIG. 9, block 107. The theory behind slope compensation is discussed in Slope Artifact Removal—Compensation (see below, III False Event Filtering) and FIG. 11.

Figure 8:
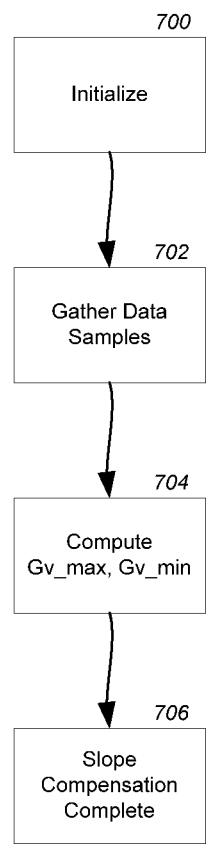
FIG. 8 shows the Slope Compensation calibration process flow.

FIG. 8 shows a diagram showing the process of slope compensation calibration.

FIG. 11 shows a diagram showing the geometry of the slope compensation process.

700—Slope compensation is a quick process performed at any time during un-calibrated or normal operation under the condition that the vehicle is stationary. This calibration is automatically performed after the static phase of calibration as well.

702—Data samples are gathered and used to generate a mean value. The data gathered is from $A_V$ from a complete or partial (static phase completed) transform solution.

704—The magnitude of the computed mean value is determined and saved as Gv_max. Gv_max is used to normalize accelerations measurements that contain error due to physical component tolerances. In the condition that the data was gathered, the magnitude of the data should be 1 G. A second value, Gv_min is calculated from the cosine of $\beta$, which is an angle parameter in the accelerometer system that represents the maximum slope angle to compensate for gravitational distortion on $A_{VX}$ and $A_{VY}$. GV_max and GV_min form boundary endpoints for use in the Slope Compensation Filter

706—The resulting values for Gv_max and Gv_min are used to update the runtime parameters and can be made permanent under direction of the installer, remote operator or self-calibration form of the dynamic calibration phase.

(III) False Event Filtering

Measurement of acceleration in 3-axes (xyz) is read from the accelerometer IC 6 via Locator 10's internal I²C bus. The collected data is referred to as vector $A_L = (A_{Lx}, A_{LY}, A_{LZ})$ and represents the measured acceleration force in each axis in the Cartesian frame of reference of Locator 10. The ever-present 1 G of gravitational force (~9.81 m/s²) is represented by vector $V = (V_X, V_Y, V_Z)$ which is always (0,0,1) in the vehicle's frame of reference.

Installation of a Locator cannot always be such that its Cartesian coordinate system is co-incident with the vehicle's coordinate system. To translate/transform accelerations into values representing vehicle motion, all data generated by the accelerometer IC 6 must be mathematically transformed. This transformation requires calibration, as explained elsewhere.

Acceleration data to be used for analysis is referenced in the vehicle's Cartesian coordinate system, where the X-axis is pointing to the front of the vehicle, the Y-axis is pointing to the left side of the vehicle and the Z-axis is pointing straight up. Data for this reference system is represented by the vector $A_V = (A_{VX}, A_{VY}, A_{VZ})$.

An intermediate step, referred to as slope (gravity) compensation, is available (as described elsewhere) to remove the ever-present 1 G gravitation vector from the data. It is intended for use by acceleration monitoring (position monitoring uses un-compensated data). Data from this compensation is referred to as $A_G$.

Acceleration data is analyzed to determine acceleration and orientation (position) violations with regard to pre-set maximums, or thresholds. This data can then be formatted and delivered to either a local or remote host for further analysis or presentation.

The False Event filtering process is shown in FIG. 9 and associated explanation.

Accelerometer Service

100—Accelerometer samples are read from the Accelerometer IC 6 at a fixed rate of time. The raw data is processed into a value for each axis, and is represented by the 3 element vector $A_L$.

101,102,103—Each axis in $A_L$ is filtered independently using a low-pass filter, such as a boxcar digital filter before undergoing transformation to the vehicle frame of reference.

104—Accelerometer samples are translated from Locator 10 frame of reference to the vehicle frame of reference to for a new vector $A_V$. This data is used as input for slope compensation 107 and vehicle attitude reporting 114-116.

105—Samples in $A_V$ are passed onto other software subsystems using the DataService.

106—A second boxcar filter (Filter 2) is used on $A_{VZ}$ only to filter out unwanted road noise that may affect slope compensation (ref. FIG. 11).

107—Accelerometer samples in $A_V$ are filtered to remove gravitational distortion due to travelling over uneven or inclined roads, see FIG. 11 for a diagram showing this distortion. The filtered data is denoted by vector $A_G$ and has the z-axis component set to zero.

108—Samples in $A_G$ are passed onto other software subsystems using the DataService.

109—Data Service is Locator 10's inter-process software that transfers data between software subsystem such as the Accelerometer service and the Accelerometer Active Monitors. Such processed data can comprise one or more of: vehicle acceleration, vehicle heading and vehicle speed.

Accelerometer Active Monitors—Acceleration Events

Blocks 110-112 show one of the available acceleration event active monitors.

110—One accelerometer axis ($A_{GX}$ or $A_{GY}$), as well as optional (configured) information on vehicle heading and speed, is selected for monitoring and this information, in the form of data samples, are passed onto 111.

111—A polarity for the given axis is selected (acceleration or deceleration or braking).

112—Event Qualification for acceleration monitors consists of examining accelerometer data samples with respect to a configured envelope. A set of samples that fit over the envelope will trigger the detection of a valid event 113. Accelerometer samples can also be configured to be qualified as valid data by using additional data, such as vehicle heading and speed, as a threshold. In this case accelerometer data would only be passed through envelope detection if it meets the threshold, e.g. required speed range, to be qualified as valid.

113—Valid events are reported. Reporting can be logged internally in Locator 10 or it can consist of a message to IMS.

Accelerometer Active Monitors—Vehicle Attitude Events

114—Vehicle attitude can only be monitored if the vehicle is not accelerating. This will gate the ability to calculate attitude angles.

115—Vehicle attitude is described using two angles. The angles are calculated from information in all three axes of $A_V$.

116—Vehicle attitude events are detected when one (or both) of the attitude angles exceed pre-programmed maximum angles. This drives the generation of an event 113.

Removal of Road Surface Artifacts

Uneven road surfaces result in signal artifacts in all three axes. Removal of these artifacts is performed using two boxcar-type (for example) digital filters. Filter no. 1 is located in front of the accelerometer service (feeding from raw signals directly from the accelerometer hardware) and Filter no. 2 is situated before the slope compensation process.

Both filters are comprised of 20 delay taps per axis (Filter no. 2 only works on the z-axis however). New samples enter the delay chain and are subsequently shifted down the chain for each new sample entering the chain. The filter can be configured to select the number of taps per axis. Given a selection of m taps on an axis, the filter will calculate an average over the m sample taps and use the result for the current sample. A tap length of 1 is equivalent to having the filter disabled for that axis.

Filter no. 1 operates on all three axes of acceleration. It processes 'raw' samples arriving directly from the Accelerometer IC 6 and passes the filtered result onto the translation process. The filter operates in Locator 10's Cartesian frame of reference.

Filter no. 2 is located in the signal processing path just before the slope compensation routine. The purpose of this filter is to provide additional filtering to just one axis (the vertical axis, $A_{VZ}$). This is required as most of the signal artifacts caused by uneven road surfaces (bumps and potholes) affect only the vertical axis and are amplified and transmitted into the $A_{VX}$ and $A_{VY}$ axis through the slope compensation routine. The same algorithm as in Filter no. 1 is used here, with the intent that it is configured with a larger number of taps to the point at which only long term effects, such as inclined roads, end up affecting the slope compensation routine (as intended).

Slope Artifact Removal—Slope Compensation

A diagram of the Slope Compensation geometry is shown in FIG. 11.

The intent of slope compensation is to remove gravity generated artifacts in the data, caused by vehicle movement on an inclined surface. To show how slope compensation works, a discussion of the theory behind it has been included.

The theory behind slope compensation will initially be explained by describing how compensation works in a 2-axis accelerometer (X and Z axis); and then expanded to all 3 axes.

FIG. 11 shows how slope compensation removes the effects of gravity in the vehicle x axis (from a two axis accelerometer).

In FIG. 11 Part A, the vehicle is parked on a level surface. All of the acceleration effects that the vehicle experiences is due to gravity, and is detected in the vertical Z-axis ($A_{VG}$). If the vehicle were to start moving, then all of the acceleration due to vehicle movement would be represented in the lateral (X and Y) axis. FIG. 11 Part A presumes that vehicle movement would only appear in the X axis. During movement, the vehicle still experiences a constant 1 G of acceleration due to gravity. As all of the gravity induced acceleration is in the Z axis ($A_{VGz}$), it can easily be removed from the output by ignoring all acceleration from the Z axis.

Slope Compensation (2D)

In FIG. 11 Part B, the vehicle is stationary on an inclined slope. Even stationary, the vehicle is experiencing forward acceleration (acceleration in the X axis) due to contribution from gravity ($A_{VG}$). In this diagram, gravity is the vector sum of accelerations in the X and Z axis:

$$A_{VG} = A_{VX} + A_{VGz} \qquad \text{Eqn. 4}$$

(This is true in Part A where the equation can be simplified as $A_{VGx} = 0$).

The constant acceleration $A_{VGx}$ is undesirable and represents a misleading acceleration of the vehicle. Slope compensation is designed to remove this acceleration. From the equation stated previously, we can see that:

$$A_{VGx} = A_{VG} - A_{VGz} \qquad \text{Eqn. 5}$$

$A_{VG}$ has been previously measured during the calibration phase of Locator installation and is a known constant. $A_{VGz}$ is solely attributed to the effect of gravity and can be measured. AVGx is then calculated for every sample and used to compensate the measured value of $A_{LX}$:

$$A_{GX} = A_{LX} - A_{VGx} \qquad \text{Eqn. 6}$$

Where:

$A_{GX}$ Compensated value for forward acceleration $A_{LX}$ Measured forward acceleration from the accelerometer $A_{VGx}$ Calculated effect of Gravity on forward acceleration Slope Compensation (3D)

In the implementation of slope compensation for the acceleration process, both $A_{Vx}$ and $A_{Vy}$ are compensated. From the example, it can be seen that $A_{VGx}$ would actually comprise accelerations in the $A_{Vx}$ and $A_{Vy}$ axes if, for example, the vehicle was turning as it accelerated up the slope. The compensation algorithm takes this into effect by breaking down the lateral component of gravitationally induced acceleration into two parts:

$$A_{VG} = A_{VGx} + A_{VGy} + A_{VGz} \qquad \text{Eqn. 7}$$

$$(A_{VGx} + A_{VGy}) = A_{VG} - A_{VGz} \qquad \text{Eqn. 8}$$

$$\text{Let } A_{VGxy} = A_{VGx} + A_{VGy} \qquad \text{Eqn. 9}$$

$$\text{So Eqn. 5 becomes: } A_{VGxy} = A_{VG} - A_{VGz} \qquad \text{Eqn. 10}$$

Unknown from the above information is how the contributions from $A_{VGx}$ and $A_{VGy}$ combine to form $A_{VGxy}$. What is known is the uncompensated values for accelerations in the X and Y axes ($A_{LX}$ and $A_{LY}$) and thus the angle ($\alpha$) of the $A_{VGxy}$ vector can be determined in the XY plane, relative to the $+A_{VX}$ axis:

$$\alpha = \tan^{-1}(A_{LX}/A_{LY}) \qquad \text{Eqn. 11}$$

$$A_{VGx} = A_{VGxy} * \cos \alpha \qquad \text{Eqn. 12}$$

$$A_{VGy} = A_{VGxy} * \sin \alpha \qquad \text{Eqn. 13}$$

Now equation 3 can be applied individually to the X and Y axes to determine compensated output for $A_{GX}$ and $A_{GY}$.

Noise in the Z axis component of acceleration ($A_{LZ}$) can cause large errors in the compensated output. To mitigate this, a digital low-pass filter is applied to the signal $A_{LZ}$ before its usage in the slope compensation routine. In addition to filtering, no compensation is performed if $A_{LZ}$ is larger than the calibrated value of 1 G gravity on the Z axis; and slope compensation is only performed up to a preset slope angle (accomplished by bounding $A_{LZ}$ between the 1 G calibrated maximum and a lower value representing $A_{VGz}$ at the preset slope angle).

In summation the algorithm works by taking each transformed sample and comparing the filtered $A_{VZ}$ component against a calibrated maximum vector length (GV_mag). The two vectors are subtracted to form a resulting vector $G_{XY}$, existing only in the $A_{XY}$ plane that represents the artifact created by the slope. If the vehicle is on a level (non-inclined) surface then this resultant is zero. The artifact vector is then further broken down into vectors $G_X$ and $G_Y$ which are then subtracted from $A_{VX}$ and $A_{VY}$ respectively to form the compensated output vector $A_G$. Note that in $A_G$ the $A_{GZ}$ axis is always zero, as this axis only contains gravity generated acceleration.

Event Qualification

Valid events are qualified by a set of parameters describing the event. An example of this is a harsh braking maneuver, which takes place over a minimum period of time and has a minimum defined deceleration amplitude.

The processes running within the active acceleration monitoring application uses this concept of qualifying valid events as a form of filtering unwanted events. This section explains each process and how it qualifies events.

Active Acceleration Event Qualification

The monitor process that checks for acceleration events (harsh braking or acceleration and excessive lateral acceleration, e.g. cornering) uses the concept of an event envelope. This envelope is described by two parameters, duration and threshold (amplitude). The process places this envelope over the signal stream and, when stream data matches (or exceeds) the envelope, an event is generated. There are four separate (identical) processes of this nature in this monitor process monitoring, $+A_{VX}$, $-A_{VX}$, $+A_{VY}$ and $-A_{VY}$. A fifth monitor ($|A_{VZ}|$) can be configured but it requires that slope compensation be disabled.

Active Position Event Qualification

This monitor process checks for vehicle orientation (posture) and will only operate when the vehicle is not actively accelerating. The intent of the routine is to monitor for vehicle rollover, for example when a tractor trailer has flipped onto its side. The conditions describing a valid event are:

The vehicle must not be experiencing any acceleration other than the gravity constant.

The angle of the acceleration vector $A_V$ (which should just consist of $A_G$) in the vehicle's coordinate frame exceeds a threshold angle.

There are two instance of this process—one while monitoring the vehicle orientation in the ZX plane and another monitoring the ZY plane.

Aggressive Driving Sensing

The accelerometer in Locator 10 being calibrated as described herein, allows measurement of dynamic vehicle behavior such as aggressive or dangerous driving behavior by the driver of the vehicle, and the generations of event records for such events. Such events can be logged to Locator memory 1, or transmitted back to vehicle monitoring applications that are part of IMS. It is possible to obtain quantitative metrics from Locator 10 that can be used to identify aggressive driving characteristics. These characteristics have been based on metrics derived from extensive studies where the test vehicles have been well instrumented. Characteristics of aggressive driving include:

1. The key characteristics to identify aggressive driving are lateral and longitudinal accelerations. The model uses two thresholds for lateral and longitudinal accelerations to indicate the driving style. The classification of the lateral and longitudinal accelerations is:

Normal Range: $|A_{vx}|<0.39$ G and $|A_{vy}|<0.45$ G

Cautionary Range: $0.39$ G$<|A_{vx}|<0.5$ G or $0.45$ G$<|A_{vy}|<0.7$ G

Aggressive Range: $|A_{vx}|>0.50$ G or $|A_{vy}|>0.70$ G

2. Speed is difficult to use as a metric because Locator 10 has no ability to determine the posted speed for the portion of the road that the vehicle is driving on. One solution is to use a database of such posted maximum speeds where available. Such information can be stored in Locator memory 1. This information is also available in many commercial GPS units (for example, the Garmin Nuvi 255) where its database contains posted speed limits for many roads worldwide. Exceeding the posted speed limit is easily detected.

An additional way is to trigger on speed events where the measured speed is in excess of the national maximum road speeds. This crude metric detects situations involving a very high and dangerous speed.

3. A combination of speed and acceleration are used to detect aggressive deceleration and acceleration maneuvers, such as where a vehicle took aggressive evasive action to avoid a crash. To detect these situations, Locator 10's location and accelerometer subsystems 5, 6 are used to record events where the following conditions (for example) are met:

A) The vehicle experiences a longitudinal deceleration of greater than 0.5 G over a period of 2.2 seconds, and B) The vehicle velocity decreased over a period of 2.2 seconds from a minimum of 35 km/h to near zero.

The above model assumes that during time TR (response time of driver) and TE (time of brake engagement of driver), there is no change in vehicle speed. After time TR+TE, the physical braking action occurs and the vehicle comes to a complete stop with constant deceleration. If use TTC (time to collision) to be four seconds, the vehicle will stop in a time of $4-T_R-T_E$ seconds. The vehicle deceleration during this event would then be $ax=V/(4-T_R-T_E)$. Using $T_R=1.5$ seconds and $T_E$ of 0.3 seconds, the longitudinal deceleration experienced when coming to complete stop from an initial speed can be approximated.

The aggressive driving metrics as determined by Locator 10 can be used in a plurality of ways. One way is to review aggressive driving behavior with drivers and have these drivers alter their driving habits such that the driving behavior is within acceptable limits set by the owner or operator of the vehicle.

Another way is to install Locator 10 in vehicles and monitor the driving behavior as part of a vehicle insurance policy. Safe drivers could be charged lower insurance premiums based on a record of few or no aggressive driving activities. Graduated insurance pricing policies can be applied where the premiums increase as a result of increased aggressive driving events over the period of the insurance policy. This provides a financial benefit to the insured for good driving habits, and reduced risk for the insurer by having a way to quantitatively monitor a driver's behavior.

The aggressive driving metrics can consist of such measures as: lateral and longitudinal accelerations and decelerations; vehicle velocity; and combinations of lateral acceleration, longitudinal acceleration, and vehicle speed.

Gravity Bias Compensation

One important issue in the interpretation of the acceleration data, especially in the longitudinal component ax, is the effect of terrain slope and gravity in adding a bias offset to the actual vehicle acceleration. When the vehicle is moving on a level surface, the accelerometer's outputs ax, ay, and az, calibrated as herein described, reflect the dynamic accelerations of the vehicle. However, when the vehicle is moving on a sloped surface, a gravitational bias component can offset all of these values.

Consider where a vehicle is on a downwardly sloped surface of pitch angle ρ and there is no roll component.

Geometry of the Accelerometer on a Sloped Surface.

In a level plane situation, the gravity vector G exerts its force only along the z-axis. In the pitched situation, the gravity vector G is rotated about the y-axis and now exerts a component on the x-axis and shows a reduced magnitude on the z-axis. In effect, the terrain slope has introduced a bias into the x-axis and z-axis data. These accelerations as measured by the accelerometer are given by:

$$\hat{a}x = ax + G \cdot \sin \rho$$

$$\hat{a}z = G \cdot \cos \rho$$

For a pitch of 6 degrees, the offset would be 0.105 G, which is significant when considering that the threshold values for the aggressive driving triggers are between 0.5 and 0.6 G along the longitudinal axis.

The gravity bias offset can be removed in one of two ways: geometrically and by high pass filtering the accelerometer data.

Geometric Solution

Since the gravitational vector G is constant and any longitudinal accelerations ($a_x$) are orthogonal to the z-axis component, the terrain pitch can be derived from the measured accelerometer value $\hat{a}_z$. This component will consist of the biased value of $a_z$ as well as any dynamic components due to the vehicle motion. A low pass filter can be used to remove the dynamic vehicle components and the result will be the mean biased value.

The steps are;

Low pass filter the data $â_z$

Calculate the terrain pitch: $\rho = \cos^{-1}(â_z/G)$

Correct the x-axis component: $a_x = â_x - G \cdot \sin \rho$

More generally, the sign of the slope (downwardly or upwardly) is needed to properly remove the offset in the $a_x$ calculations, and this can be obtained simply (or equivalently—see Slope Compensation calibration described above).

High Pass Filtering Solution

The bias offsets due to terrain slope represent low frequency spectral components in the data, since the dynamic accelerometer sample components are higher in frequency than the slowly varying effects of terrain. Using this fact, the low frequency terrain related effects can be removed using a simple high pass filter on the, for example, Ax data. The output of this filter would be the higher frequency components arising from the vehicle dynamics.

Below is the pseudo code for a conventional digital implementation of a 1st order (RC) high pass filter.

```
// Return RC high-pass filter output samples, given input samples,
// time interval dt, and time constant RC
function highpass(real[0..n] x, real dt, real RC)
  var real[0..n] y
  var real κ := RC / (RC + dt)
  y[0] := x[0]
  for i from 1 to n, and a suitable κ
    y[i] := κ * y[i−1] + κ * (x[i] − x[i−1])
  return y
```

The loop that calculates each of the n outputs can be re-factored into the equivalent:

for i from 1 to n $$y[i] := K *(y[i-1]+x[i]-x[i-1])$$

Excessive Vibration Sensing

Another aspect of this invention is to measure vibration-based acceleration in the vehicle and use the measured vibration as an indicator of a vehicle problem. When a vehicle is stationary, the measured acceleration components can be compared against a baseline set of measurements, and when the baseline set is exceeded, an alarm event can be generated. Since dynamic acceleration components are of interest, the aligned acceleration components can be filtered with a high pass filter or band-pass filter to remove any DC or low frequency components that are not of interest.

As an illustrative example, the three directional accelerations of the vehicle would be band-pass filtered with a center frequency of 20 Hertz, which would be consistent with an engine speed of 1200 RPM. The average and peak accelerations in each direction from each band pass filter when the engine is at idle (i.e. the vehicle is stationary) determine a baseline to establish the normal operating vibration-based accelerations along the three axes in the vehicle frame of reference. Once calibrated, these baseline values would be compared with measured values obtained during normal operation of the vehicle. The geo-spatial positioning information, such as that obtained from the GPS data, can be used to establish when the vehicle is stationary and the External I/O used to determine when the engine is running. Average acceleration figures from the tri-axial accelerometer band pass filter outputs would be compared with the baseline reference values. If these measured values exceed the baseline values by a predetermined amount, a vibration alarm event would be generated. Additional band pass filter center frequencies are used to determine vehicle vibration-based acceleration components that are of interest for other engine operating speeds.

In addition, the power spectra of the acceleration measurements can be obtained with appropriate transforms (e.g. the Fourier Transform). The envelope of the power spectrum is obtained with the vehicle is stationary and the engine running. The power spectrum is determined for each of the three acceleration axes, and is used to establish a baseline under normal operating conditions. Once calibrated, these baseline power spectral envelopes would be compared with measured power spectral envelopes obtained during normal operation of the vehicle. The geo-spatial positioning information, such as that obtained from the GPS data, can be used to establish when the vehicle is stationary and the External I/O used to determine when the engine is running. Acceleration spectral envelopes from the tri-axial accelerometer outputs are compared with the baseline reference acceleration envelopes. If these measured envelopes exceed the baseline envelopes by a predetermined amount, a vibration alarm event would be generated. As an additional feature of this aspect of the invention, the power spectral data measured for each accelerometer axis and other vehicle information acquired via the External I/O interface are transmitted via the wireless modems means to IMS, where vehicle diagnostics can be performed. The data can also be recorded in Locator 10 or IMS application for later reference and analysis.

Sensor Fusion

"Sensor fusion" can be implemented to increase the accuracy of the above-described accelerometer-based results. The idea is to combine or fuse information from different mediums or sensors and use the Kalman filter to weigh the different mediums most heavily in the circumstances where they each perform best, thus providing more accurate and stable estimates than a system based on any one medium alone. For example, three gyroscopes (based on MEMS, for example), can be provided (one for each axis). Their outputs are incorporated by integrating the accelerometer and gyroscope outputs using an indirect feedback Kalman filter (or Complementary Filter) or other stochastic filter. The Complementary Filter uses two orientation estimates, with differing noise characteristics, to produce a single orientation estimate combining the advantages of each. It may be that the gyroscopic outputs are used as a second reference for which the difference with the accelerometer outputs is continuously calculated as error estimates to correct the accelerometer outputs. Due to the complementary nature of the filter, there is no group delay in the filter response.

The GPS velocity and heading data can also be integrated into the filter to further improve the filtering of the vehicle dynamics.

Correcting for Turning Error

Locator 10 might not be (and often will not be) positioned directly over the vehicle's center of rotation (which is the position directly over the rear differential of the rear axle, or equidistant between the two rear differentials in the case of dual rear-axle vehicles). If not so positioned, then an acceleration error will be introduced whenever the vehicle turns left or right. The acceleration error will be proportional to the distance between the installation point and the vehicle center of rotation, and to the angular acceleration of the vehicle as it turns.

Two components of acceleration will be present, on the (calibrated) X and Y axis of Locator 10. The X-axis component is the centripetal or normal acceleration $a_n$ and is a direct cause of the rotation velocity (ωR) of the vehicle as it turns, and is formulated as Eqn. 14. The acceleration on the Y-axis is the tangential acceleration $a_t$ and is generated by the rotational acceleration of the vehicle as it turns, and is formulated as Eqn. 15. Both components of acceleration are relative to the arc that is transcribed by Locator 10 as it moves in the turning vehicle through angle change ξ about the vehicle's Z-axis.

$$a_n = \frac{v^2}{R}, \quad v = \omega R = \frac{\frac{\pi}{180}\xi R}{t} \qquad \text{Eqn. 14}$$

Normal Acceleration due to constant turn rate $$a_t = \dot{v} = \frac{dv}{dt} = \omega R = \frac{\frac{\pi}{180}\xi R}{t^2} \qquad \text{Eqn. 15}$$

Tangential Acceleration due to changing turn rate

For example, suppose Locator 10 is installed in the cab of a truck at a point that is 4 meters from the center of rotation. Suppose, for example, the truck makes a right turn with an angular velocity of 20 degrees/second. As it starts the turns, it takes one second for it to enter the curve, causing a constant acceleration of 20 degrees/second/second over that initial second. The remainder of the turn is completed at a constant rotational velocity (there is another acceleration event as the truck comes out of the turn but this is not part of this example).

Using the above two equations 14 and 15, Locator 10 will experience a centripetal acceleration of:

$$a_n = \frac{\left[\frac{\frac{\pi}{180} \cdot (20) \cdot (4)}{t}\right]^2}{4} = 0.487 \text{ m/s}^2$$

(or 0.050 G) backwards, towards the rear of the vehicle (−Ax acceleration) while the truck is turning.

The initial tangential acceleration is then:

$$a_t = \frac{\frac{\pi}{180} \cdot (20) \cdot (4)}{t^2} = 1.396 \text{ m/s}^2$$

(or 0.142 G) along the +$A_Y$-axis for the first second of the turn.

Calculated accelerations $a_n$ and $a_t$ can be used to compensate for turning error in the use of forward and lateral acceleration data (for example, as produced by the calibrated accelerometer process, described above) in the process of event filtering (or qualification). This filtering would correct forward acceleration ($A_{VX}$) by removing $a_n$ from it. To continue with the above example, this compensation is represented by Eqn 16 (below); and similarly, $a_t$ would compensate for turning error in the lateral acceleration $A_{VY}$ by removing the acceleration $a_t$ there from, as represented by Eqn 17.

$$At_{VX} = A_{VX} + 0.050 \qquad \text{Eqn 16}$$

$$At_{VY} = A_{VY} - 0.142 \qquad \text{Eqn 17}$$

$At_{VX}$ and $At_{VY}$ are the turning error compensated output of $A_{VX}$ and $A_{VY}$ respectively.

Turning error compensation can be used to compensate for acceleration errors that occur while the vehicle is turning and Locator 10 is mounted in a vehicle in a location that is offset by a distance from the vehicles center of rotation. Turning error compensation calculation needs to know the angular velocity (turn rate) and the angular acceleration (turn rate over time) of the vehicle, to perform the required calculations; these can be obtained from a gyroscope integrated into or otherwise informationally associated with, Locator 10 product. Turning error compensation can be calculated alongside the slope compensation process (described above) to correct the acceleration outputs $A_{VX}$ and $A_{VY}$, used later on to catch vehicle events of interest (harsh braking, excessive turns, and the like).

Examples of gyroscopes are the ADXRS150 from Analog Devices. Measurement of the pitch, yaw, and roll rates can be combined into a multi-axis gyro using a two axis or three axis gyroscope such as the LPR430AL or LYPR540AH from STMicroelectronics respectively. Examples of acceleration measurements devices include the STMicroelectronics LIS302DL 3-Axis accelerometer and the Bosch Sensortech SMB380 Triaxial accelerometer.

Design of appropriate filters and related technologies described above, is assisted by conventional knowledge, including: 1. John R. Treichler, C Richard Johnson Jr., & Michael G. Larimore; "Topics in Digital Signal Processing: Theory and Design of Adaptive Filters"; John, Wiley & Sons, 1987. 2. Authur A. Giordanao, Frank M. Hsu; "Least Squares Estimation with Applications to Digital Signal Processing"; John Wiley & Sons, 1985. 3. Michael L. Honig and David G. Messerschmitt, "Adaptive Filters: Structures, Algorithms, and Applications", Kluwer Academic Publishers, 1984.

Herein, the term "including" means including without limitation or prejudice to the generality of any description, definition, term or phrase preceding that word, and the word "include" and its derivatives are to be construed accordingly. Also, any example presented herein is done so in a non-limiting way and is to be understood in an inclusive way, in accordance with above definition of "including".

Herein, the term "plumbed surface" refers to a flat and uniform surface that is normal (perpendicular in all directions) to Earth's gravitation vector.

Although a tri-axial accelerometer sensor is described above, the above principles are easily embodied in conjunction with a combination of a single axis accelerometer sensor and a double-axis accelerometer sensor; and a combination of three single axis accelerometer sensors; as long as all three Cartesian X-Y-X axes are covered.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

The Abstract of the Disclosure is provided to comply with 37 C.F.R. section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

We claim:

1. A method of monitoring operation of a mobile asset installed with a monitoring device comprising:
    installing in the mobile asset an accelerometer device for providing outputs representing accelerations along three orthogonal axes;
    low-pass filtering the outputs with one or more filters;
    transforming, by said monitoring device, the low-pass filtered outputs to represent acceleration along orthogonal forward, sideways and vertical axes of the mobile asset;
    configuring, in said monitoring device, one or more acceleration envelopes to correspond to one or more events, each acceleration envelope defined by a duration of time and an amplitude;
    determining, by said monitoring device, a speed of the mobile asset;
    comparing, by said monitoring device, the determined speed of the mobile asset to a threshold speed;
    determining, by said monitoring device, that the determined speed is above the threshold speed;
    determining, by said monitoring device, an acceleration profile of the mobile asset by:
        recording over a duration of time a plurality of values of acceleration of the mobile asset, wherein the transformed, low-pass filtered outputs are used to determine the values of acceleration of the mobile asset;
        compensating said values of acceleration for gravity (G);
        low pass filtering the acceleration along the vertical axis to obtain âz;
        calculating a pitch of a slope upon which the mobile asset is moving: $\rho=\cos^{-1}(\hat{a}z/G)$;
        determining a sign of the slope; and
        correcting the acceleration along the forward axis by subtracting therefrom $G \cdot \sin \rho$;
    comparing, by said monitoring device, the determined acceleration profile of the mobile asset to said acceleration envelopes;
    determining, by said monitoring device, that the determined acceleration profile of the mobile asset lies entirely outside at least one of said acceleration envelopes; and
    reporting the event that corresponds to said one of said acceleration envelopes.

2. A method according to claim 1 wherein each low-pass filtering is achieved by averaging a series of acceleration data points.

3. A method according to claim 1 further comprising the steps of:
    prior to reporting said event, determining, by said monitoring device, that the mobile asset is no longer accelerating; and additionally
    determining, by said monitoring device, attitude of the mobile asset.

4. A method according to claim 3 wherein the reporting of the event includes the attitude determined by said monitoring device.

5. A method according to claim 1, in which gravity is compensated for by high pass filtering the acceleration along the forward axis.

6. The method of claim 1, further comprising the step of storing said values of acceleration in memory in said monitoring device to establish a temporal record of acceleration of the mobile asset.

7. A method according to claim 1 wherein the reported event is reported as cautionary when the determined acceleration profile of the mobile asset is outside a first acceleration envelope or reported as aggressive when the determined acceleration profile of the mobile asset is outside a second envelope, wherein the second envelope is higher and/or longer in duration than the first envelope.

8. A method according to claim 1 wherein a heading of the mobile asset is determined, by said monitoring device, and the event is based on the heading.

9. A method according to claim 1 wherein the speed is determined, by said monitoring device, from said accelerations.

10. A method according to claim 9 wherein the event is reported because:
    the monitoring device determines that the mobile asset experiences a deceleration greater than a threshold deceleration over a predetermined period; and
    the monitoring device determines that the mobile asset velocity decreases over said period from above the threshold speed to near zero.

11. An apparatus for monitoring operation of a mobile asset comprising:
    three orthogonal accelerometers for providing outputs representing accelerations along three orthogonal axes, said accelerometers installed in the mobile asset;
    a low-pass filter connected to each accelerometer output for providing filtered outputs;
    a device for transforming the filtered outputs into accelerations along orthogonal forward, sideways and vertical axes of the mobile asset;
    a further low-pass filter for further filtering the acceleration along the vertical axis of the mobile asset; and
    a device into which is input the further filtered acceleration along the vertical axis and the filtered accelerations along the forwards and sideways axes and which outputs compensated accelerations along orthogonal forward, sideways and vertical axes of the mobile asset;
    wherein said device compensates said filtered and further filtered accelerations for gravity (G) and slope on which the mobile asset is moving by:
        low pass filtering the acceleration along the vertical axis to obtain âz;
        calculating a pitch of a slope: $\rho=\cos^{-1}(\hat{a}z/G)$;
        determining a sign of the slope; and
        correcting the acceleration along the forward axis by subtracting therefrom $G \cdot \sin \rho$;
    a monitoring device, operative when the mobile asset is moving and the speed of the mobile asset is above a threshold speed,
    wherein said monitoring device:
        records over a duration of time a plurality of values of compensated acceleration of the mobile asset to form an acceleration profile;
        compares the acceleration profile to a predetermined accelerating envelope that is defined by the duration of time and an amplitude;
        determines that the profile of compensated acceleration lies entirely outside the acceleration envelope; and
        reports an event that corresponds to said acceleration envelope.

* * * * *